(12) United States Patent
Lim

(10) Patent No.: US 6,766,168 B1
(45) Date of Patent: Jul. 20, 2004

(54) PACKET DATA SERVICE NETWORK IN A MOBILE RADIO COMMUNICATION NETWORK AND METHOD OF OPERATING A PACKET DATA SERVICE USING THE PACKET DATA SERVICE NETWORK

(75) Inventor: Byung Keun Lim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/501,276

(22) Filed: Feb. 9, 2000

(30) Foreign Application Priority Data

Feb. 12, 1999 (KR) .......................................... 1999-5104

(51) Int. Cl.[7] .............................. H04Q 7/20; H04Q 7/00
(52) U.S. Cl. ................... 455/435.1; 360/328; 360/329; 360/331; 360/349; 360/352; 360/353; 455/422.1; 455/432.1; 455/433; 455/436; 455/437; 455/442
(58) Field of Search ............................... 370/310, 310.1, 370/310.2, 313, 328, 345, 349, 352, 353, 354, 355, 356, 351, 329, 331; 455/422, 432, 433, 435, 436, 437, 442

(56) References Cited

U.S. PATENT DOCUMENTS

| | | | | |
|---|---|---|---|---|
| 5,936,948 A | * | 8/1999 | Sicher | ......................... 370/314 |
| 5,949,773 A | * | 9/1999 | Bhalla et al. | ................ 370/331 |
| 6,137,791 A | * | 10/2000 | Frid et al. | ..................... 370/352 |
| 6,195,705 B1 | * | 2/2001 | Leung | ......................... 709/245 |
| 6,230,012 B1 | * | 5/2001 | Willkie et al. | ............ 455/435.1 |
| 6,414,950 B1 | * | 7/2002 | Rai et al. | ...................... 370/338 |
| 6,496,505 B2 | * | 12/2002 | La Porta et al. | ............. 370/392 |
| 6,501,746 B1 | * | 12/2002 | Leung | ......................... 370/338 |

* cited by examiner

*Primary Examiner*—Huy D. Vu
*Assistant Examiner*—Thomas E. Volper
(74) *Attorney, Agent, or Firm*—Fleshner & Kim, LLP

(57) ABSTRACT

A packet data service system and operating method thereof in a mobile radio communication network is provided, which can support link mobility by maintaining a data connection between a mobile station and an initially connected interworking function device when a mobile packet data service is provided in the environment of a mobile radio communication network of cellular/PCS/IMT-2000. The packet data service system includes a packet router for providing originating or terminating traffic paths for a plurality of mobile stations and managing particulars of an event whenever the event is produced in the mobile stations, and an interworking function device for controlling the packet router to interwork with another network. If a mobile station deviates from a predetermined service area of the interworking function device while the mobile station is being served with a packet data service interworking with the another network, the packet router continuously maintains the initially determined data link between the mobile station and the interworking function device.

37 Claims, 21 Drawing Sheets

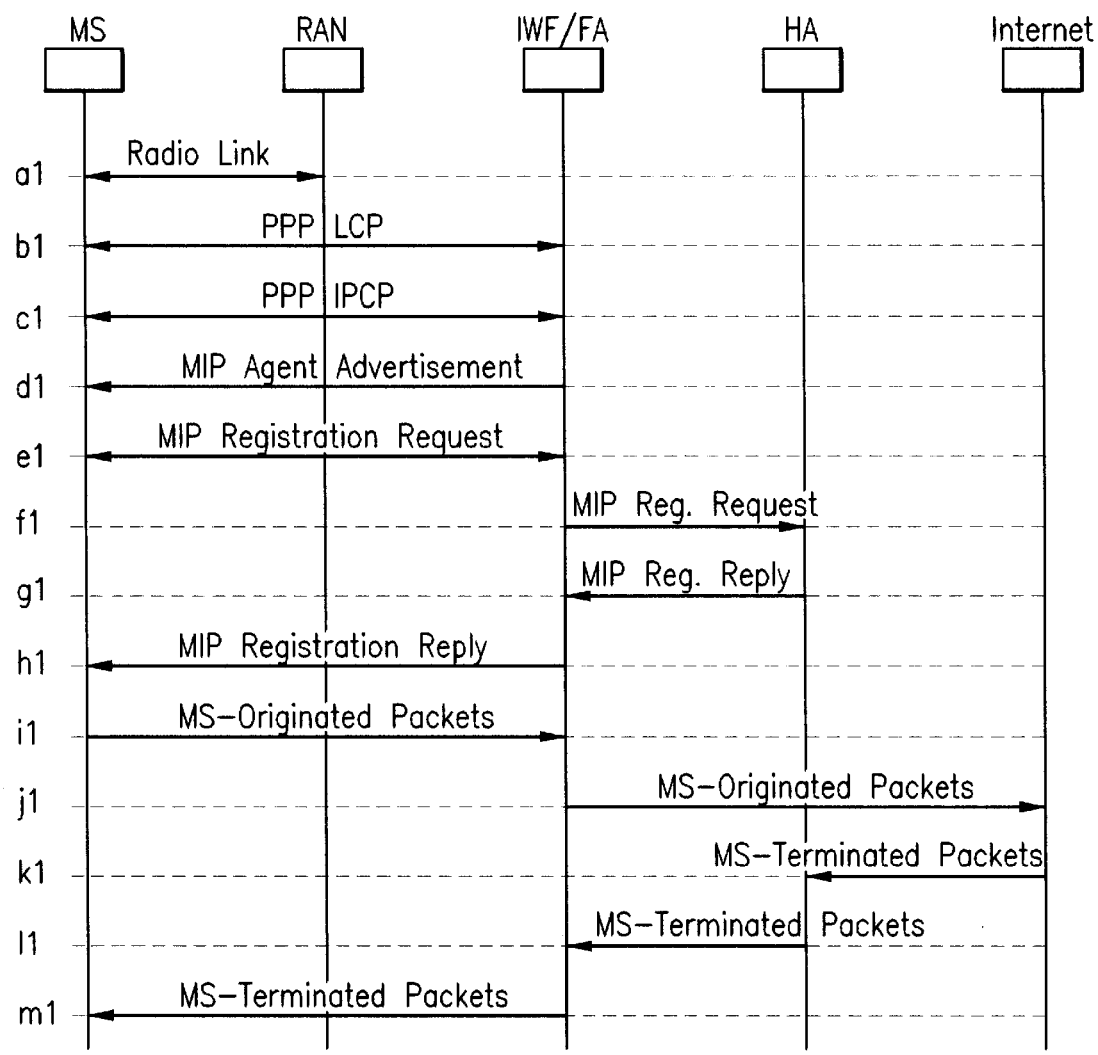

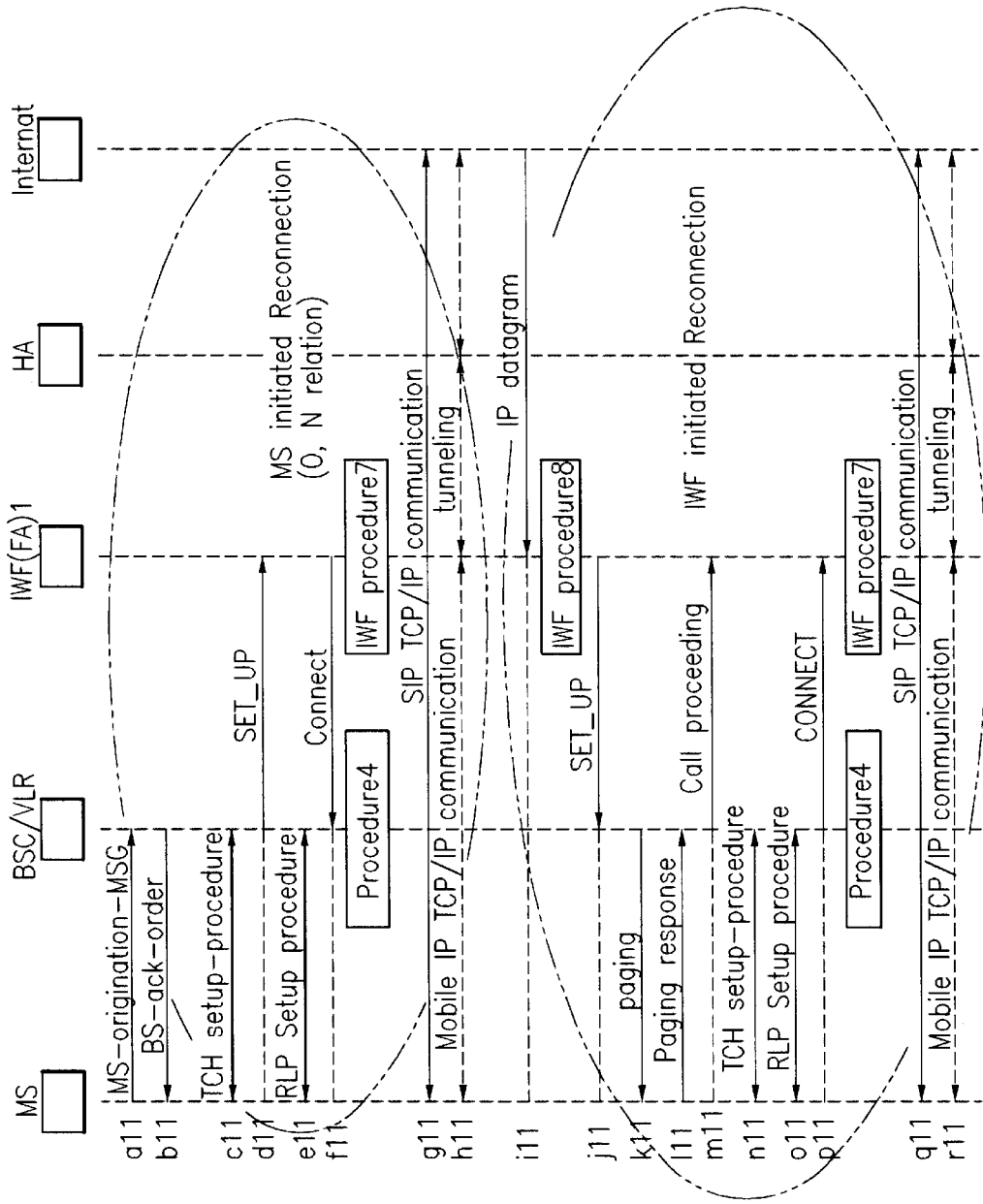

PACKET DATA SERVICE NETWORK IN A MOBILE RADIO COMMUNICATION NETWORK AND METHOD OF OPERATING A PACKET DATA SERVICE USING THE PACKET DATA SERVICE NETWORK

BACKGROUND OF THE INVENTION

1. Field of the Invention

The present invention relates generally to a packet data service network in a mobile radio communication network. In particular, the present invention relates to a packet data service network for a mobile station and a method of operating a packet data service using the packet data service network.

2. Background of the Related Art

In order to provide a packet data service in a mobile radio communication network based on IS-95 series a protocol function should be first provided to each network element which constitutes the mobile radio communication network as shown in FIG. 1. Specifically, a radio link protocol (RLP) of a radio section, a packet transmission link of an infrastructure section, and a frame relay link of a section between an interworking function device (IWF) and a base station controller/mobile switching center are respectively provided as a lower layer relay for transferring point-to-point protocol (PPP) link data between a mobile station (MS) and the IWF, while an Internet protocol (IP) network layer is provided as an upper layer of the PPP link.

A packet service procedure as shown in FIG. 2 should be performed to provide an Internet packet service to a certain mobile station (MS) using the above-described protocols.

Referring to FIG. 2, at step a1, a mobile station (MS) is identified by and connected to a radio access network (RAN). At this time, dedicated resources between the MS and the RAN and between RAN and the IWF are adjusted.

At step b1, a PPP link between the MS and the IWF is determined using PPP LCP.

At step c1, the MS instructs the IWF to determine a permanent home address using PPP IPCP.

At step d1, the IWF/FA transmits an agent advertisement message and a care of address (COA) of an external agent to the MS using a mobile IP (MIP). At this time, the MS transmits an agent solicitation message to a foreign agent (FA), or responds to the FA with its agent advertisement reply.

At step e1, the MS determines whether the COA of the external agent is new or not. If the COA is new, the MS sends a registration request message to the FA to initialize a mobile IP registration. At this time, such a registration request message includes the home address of the MS, the home agent (HA) address, the address of the FA, and information on an identification extension between the MS and the HA.

At step f1, the FA sends an identification request message to the HA.

At step g1, the HA confirms the identification extension between MS and HA when FA receives the registration request message. At this time, if the identification of the MS is completed, the HA includes the home address of the MS in the COA of the FA and sends an identification reply to the FA. If the identification of the MS fails, or the HA rejects the registration request for a certain reason, the HA transfers the registration reply message to the FA, which indicates the reason of rejection.

At step h1, if the registration reply indicates that the HA accepts the registration request, the FA adds the home address of the MS and the registration lifetime to an FA visitor list, and then sends the registration reply to the MS.

At step i1, if the mobile IP registration is successfully performed, the MS may send the packets to the Internet to transmit the packets to a destination. The packets of the originating MS are sent to the IWF through the PPP link.

At step j1, the FA may route the packets of the terminating MS to the Internet, or send the packets directly to the HA.

At step k1, the packets of the terminal MS are routed to the HA.

At step l1, the HA sends the packets of the terminating MS directly to FA.

At step m1, the FA removes a tunnel overhead, and sends the packets of the terminating MS to the MS through the PPP link.

Specifically, as shown in FIG. 2, the mobile station is allocated with the Internet IP address to have the Internet packet service. This IP address is allocated as a temporary address or care of address (COA) during the set-up of the PPP link by the IWF, which matches the communication protocol so that the MS is connected to the existing wired network.

The IP address used by the MS is always related to IWF, and thus if the connection between the MS and the IWF, which is connected to the PPP link is cut off, the software of the upper layer should be directed to use a new IP address.

Accordingly, in order for the MS to perform a seamless Internet packet data communication, the mobile IP function of supporting the mobility of the IP address should allow for the continuous use of the IP address even though the MS deviates from the service area of the IWF. For the effective support of the mobility of the IP address, the area of the radio base station is divided into packet zones, and each specified IWF provides the service for each specified packet zone. At this time, the base station provides a lower function that the base station broadcasts a packet zone identifier as a system message so that the MS can identify its packet zone.

For instance, the MS, which is served with the mobile IP service by the mobile client software, receives the packet zone related information broadcasted from the system, and compares the information with a packet zone identifier stored therein.

If the two packet zone identifiers are different from each other as a result of comparison, the MS deviates from the IWF area to which the MS has connected, connects with a new IWF, and then sends the solicitation message to the IWF connected to the FA. The MS receives the FA advertisement information provided by the IWF as a reply message, and performs the mobile IP registration if the message indicates a new FA.

As a result, the mobile IP terminal can perform the Internet packet service continuously with its own IP address.

However, whenever the MS moves from a first packet zone to another packet zone to effect the mobile IP registration, it takes a lot of time to set up a new PPP link.

Also, since the MS should pass the FA solicitation procedure, the FA advertisement procedure, and the mobile IP registration procedure, a seamless handoff of the MS cannot be actually achieved. Accordingly, the MS may lose many packets that it has from the time when the MS moves to another packet zone to the time when the MS completes a new mobile IP registration.

Also, if a simple IP terminal having no mobile client software changes its packet zone, the currently used IP can no longer be used, and the upper application service layer should be completely restarted.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a packet data service network in a mobile radio communication network and a method of operating a packet data service that substantially obviates one or more of the problems caused by the disadvantages of the related art.

Another object of the present invention is to provide a packet data service network in a mobile radio communication network and a method of operating a packet data service using the packet data service network which can maintain the PPP link of a mobile station and an interworking function device (SIWF) based on the relationship between an interworking function device (AIWF) for performing a relay link connection for connecting the mobile station and the interworking function device in a new area and the interworking function device (SIWF) which maintains the PPP link before the movement of MS in case that the mobile station deviates from a determined area while the mobile station is being served with the packet data service in the environment of a mobile radio communication network of cellular/PCS/IMT-2000.

Another object of the present invention is to provide a protocol operating method for performing a packet data service in a mobile radio communication network which can perform the mobile packet data service using a PPP link determined before the movement of a mobile station and a protocol of an upper layer of the PPP layer without the redetermination of a new PPP link and protocol of the PPP layer of the PPP layer if the mobile station deviates from a determined area while the mobile station is being served with the packet data service in the determined area.

Another object of the present invention is to provide a packet data service network in a mobile radio communication network which can provide the shortest access time by maintaining the initially determined link path between a mobile terminal and a base station controller or a mobile switching center when the mobile terminal deviates from a determined area while the mobile terminal is being served with the packet data service in the environment of the mobile radio communication network of cellular/PCS/IMT-2000, or the registration of a new location of the mobile terminal is not supported when the mobile terminal moves, or even in the environment of the mobile radio communication network based on IS-95A and IS-95B which is currently providing a commercial service.

To achieve at least these objects in whole or in parts and in accordance with the purpose of the present invention, as embodied and broadly described, the packet data service system in a mobile radio communication network comprises a packet router for providing originating or terminating traffic paths for a plurality of mobile stations and managing particulars of an event whenever the event is produced in the mobile stations, and an interworking function device for controlling the packet router to interwork with another network, wherein if a certain mobile station among the plurality of mobile stations deviates from a predetermined service area of the interworking function device while the mobile station is being served with a packet data service interworking with the another network, the packet router continuously maintains a point-to-point (PPP) link initially determined between the mobile station and the interworking function device in accordance with the managed particulars of the event.

In another embodiment of the present invention, there is provided a method of operating a packet data service in a mobile radio communication network comprising the steps of setting up a point-to-point (PPP) link between a mobile station and an interworking function device for interworking packet paths between the mobile station and another network in accordance with the packet data service required by the mobile station, managing particulars of an event using at least one information table in a packet router for routing the PPP link whenever the event is created by the mobile station, and continuously maintaining the PPP link initially determined or changing a relay path between the mobile station and the packet router using the managed particulars of the event in accordance with a cause of the event in the packet router if the event is created in a state that the mobile station deviates from a predetermined area.

In still another embodiment of the present invention, there is provided a method of operating a protocol communication in a mobile radio communication network comprising the steps of connecting relay links between a certain mobile station and a packet router and between the packet router and an interworking function device if the mobile station requests a packet data service, determining a point-to-point (PPP) link between the mobile station and the packet router through the link layer, performing an Internet packet data service in the mobile station using an Internet protocol (IP) address which indicates a permanent home address for the interworking function device, and maintaining the PPP link initially determined between the mobile station and the packet router if the mobile station which is being served with the packet data service still requires the packet data service even when the mobile station deviates from a predetermined unit area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a time sequence diagram illustrating the packet service procedure using the protocol as shown in FIG. 1.

FIGS. 16 to 20 are time sequence diagrams depicting various procedures produced during the packet data service in a mobile radio communication network according to preferred embodiments of the present invention.

DETAILED DESCRIPTION OF PREFERRED EMBODIMENTS

Figure 1:
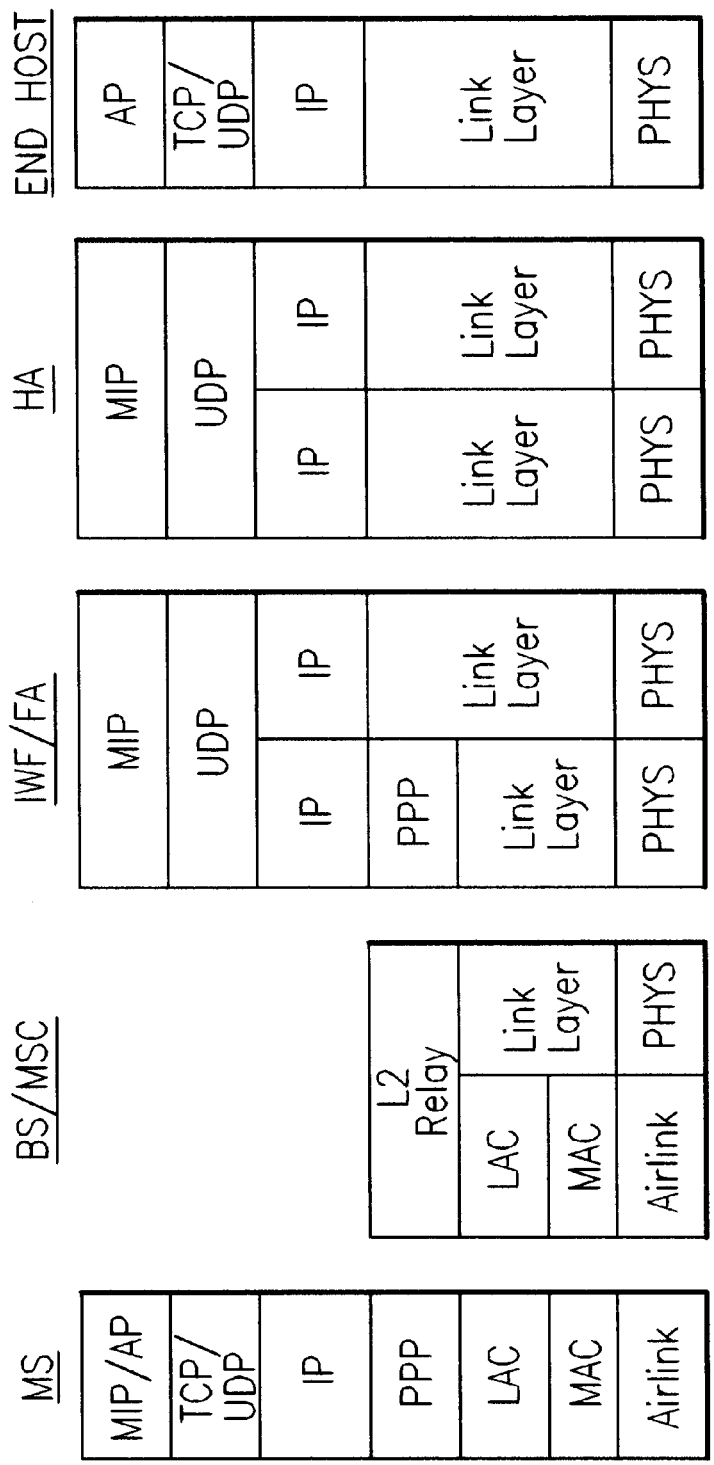
FIG. 1 is a drawing illustrating a protocol stack used for the packet data service in a mobile radio communication network.
Figure 3A:
FIGS. 3a to 3c are drawings illustrating the connection state between respective network elements to provide a packet data network in a mobile radio communication network.
Figure 3B:
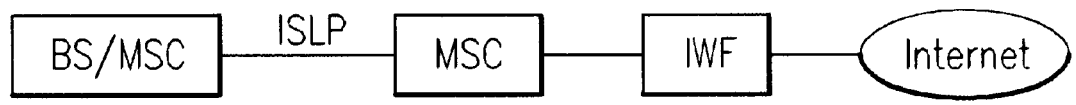
Figure 3C:
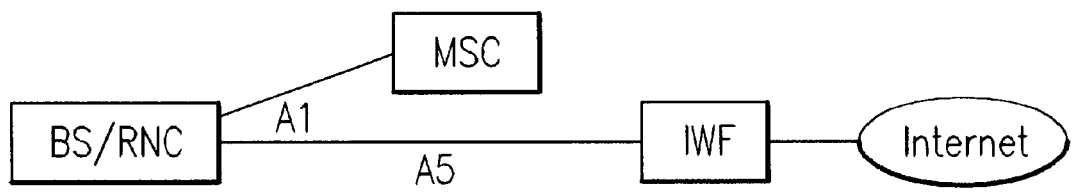

Reference will now be made in detail to the preferred embodiments of the present invention, examples of which are illustrated in the accompanying drawings. FIGS. 3a to 3c are views illustrating the connection state between respective network elements to provide a packet data network in a mobile radio communication network.

Referring to FIGS. 3a to 3c, if the MS, base station controller (BSC), mobile switching center (MSC), link or MS for connecting IWF, BSC/RNC, and IWF connection link for connecting IWF are maintained without any change in a mobile radio communication network, even a simple IP terminal which has no mobile client software can maintain its connection link regardless of its packet zone.

To prevent the waste of time and the loss of packet data caused by the redetermination of the PPP link, the mobile IP (MIP) terminal places and manages in the MSC/VLR a packet mobility binding table (PMBT) for the MS which requested the packet service. It also places and manages in the IWF and manages a mobile station mobility binding table (MBT) of the MS. Accordingly, the link connection between the BSC and the IWF is controlled by the MIP terminal in accordance with the information from the PMBT and the MBT.

According to the construction of FIG. 3a, the BS/MSC and the IWF are connected through an L interface, and the IWF does not divide the BS/MSC into a base station subsystem (BS) and a mobile switching center (MSC).

According to the construction of FIG. 3b, an anchoring MSC is coupled to the IWF and the serving BS/MSC to which a mobile terminal is coupled, and maintains the link between the MS and the IWF though the terminal moves to another serving BS/MSC. At this time, an inter system link protocol (ISLP) is used as a data transmission link protocol between the serving BS/MSC and the anchoring MSC.

According to the construction of FIG. 3c, the BS/MSC is divided into a BS and a MSC, and an A1 interface is connected between the BS and the MSC as a signaling link therebetween. Also, an A5 interface is connected between the IWF and the BS or a radio network controller (RNC) as a data link therebetween.

Figure 5:
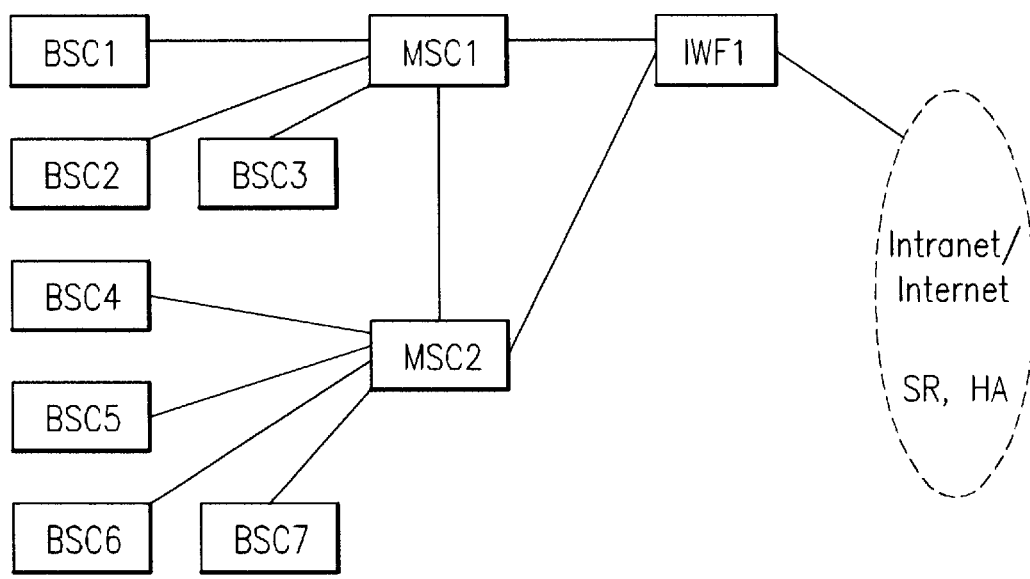
FIG. 5 is a block diagram of an MSC-IWF matching type packet data network wherein a plurality of mobile switching centers are connected to one interworking function device in a mobile radio communication network according to a preferred embodiment of the present invention.
Figure 6:
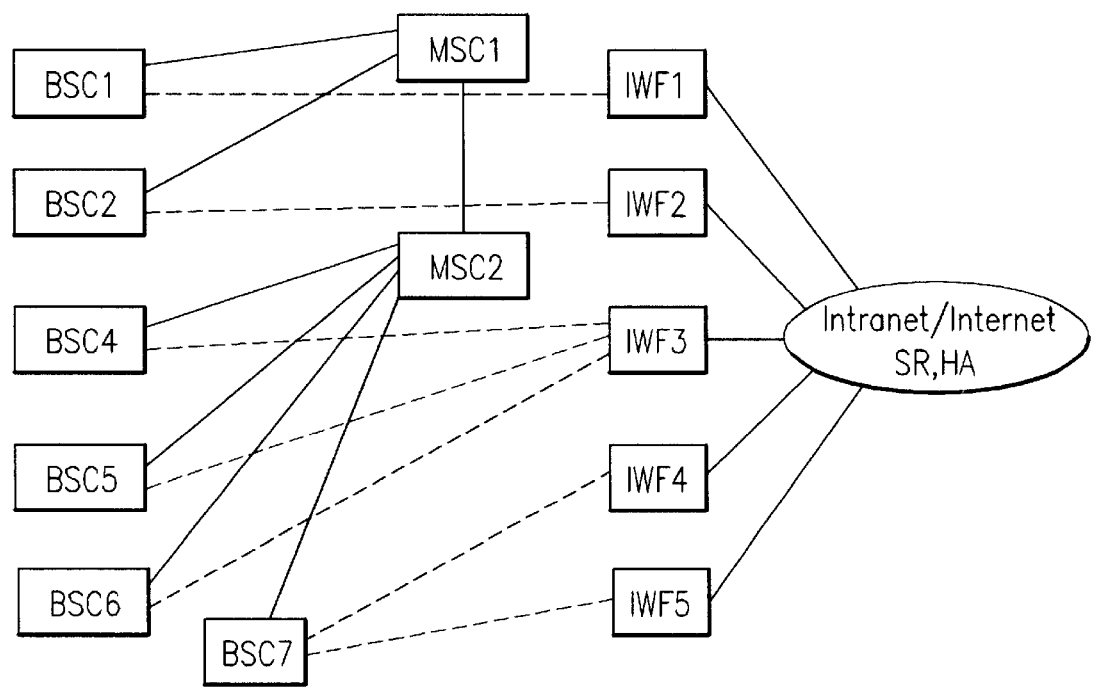
FIG. 6 is a block diagram of a BSC-IWF matching type packet data network wherein a base station controller and an interworking function device are connected together in a mobile radio communication network according to a preferred embodiment of the present invention.

FIGS. 3a to 3c show the network constructions for the packet data service referring the current standard. In practice, the packet data networks for providing the packet data service are constructed as shown in FIGS. 4 to 6, considering the capacity of the IWF, the number of MS users, the amount of data, etc.

Figure 4:
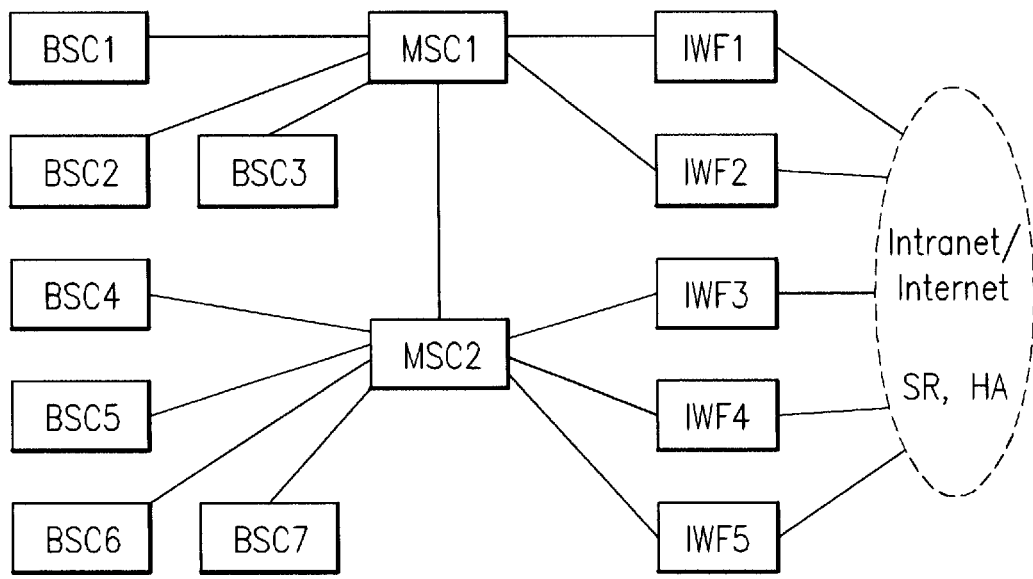
FIG. 4 is a block diagram of an MSC-IWF matching type packet data network wherein a plurality of interworking function devices are connected to one mobile switching center in a mobile radio communication network according to a preferred embodiment of the present invention.

FIG. 4 illustrates the construction of an MSC-IWF matching type packet data network wherein a plurality of interworking function devices are connected to one mobile switching center in a mobile radio communication network according to a preferred embodiment of the present invention. Referring to FIG. 4, though the MSC can process all packet data with one IWF, the number of IWFs may be increased in proportion to the increased number of users.

At this time, in order to support the mobile IP for the packet zones, the IWF should correspond to the packet zones or packet registration areas (PRA), and the respective PRA should have a unique serving IWF.

Also, the IWF can provide the same service with respect to a plurality of packet zones. When performing a hard handoff between MSCs, the ISLP protocol between the MSC can maintain the data link between the IWF and the MS connected to the initial serving IWF.

FIG. 5 illustrates the construction of an MSC-IWF matching type packet data network wherein a plurality of mobile switching centers are connected to one interworking function device in a mobile radio communication network according to a preferred embodiment of the present invention. Referring to FIG. 5, one internetworking function device IWF1 provides the same service to a plurality of MSCs. The mobile radio communication network having such a construction is mainly used when the packet traffic amount is small or when the capacity of the IWF is large.

This construction is useful when one IWF provides the service, since the packet zone may be determined based on the MSC as well as the BSC.

FIG. 6 illustrates the construction of a BSC-IWF matching type packet data network wherein a base station controller and an interworking function device are connected together in a mobile radio communication network according to a preferred embodiment of the present invention. Referring to FIG. 6, one BSC is connected to a serving IWF (BSC1-IWF1 or BSC2-IWF2), or a plurality of BSCs are connected to a serving IWF (BSC4,BSC5,BSC6-IWF3). Selectively, one BSC may be connected to a plurality of IWFs (BSC7-IWF4,IWF5).

However, the current sandard (Is-95B and Is-2000) which provides the packet zone type Internet packet service based on the packet network having the BS/MSC-IWF connection as shown in FIGS. 4 to 6 has the following problems.

First, the standard for determining the packet zone as well as a method of determining the relationship between the packet and the serving IWF is not accurately proposed.

Next, if the MSC controls a FR-SVC link to be maintained in the event that the simple IP mobile station restricts the connection of the MSC only to the serving IWF according to the packet zone in the packet network wherein a plurality of IWFs are connected to one mobile switching center as shown in FIG. 4, it does not redetermine the PPP link. Nevertheless, if the packet zone identifier (PZID) is changed, the IP address should be updated and the application layer should be also redetermined by releasing the PPP link connection with the existing serving IWF and then connecting the PPP link to the serving IWF of a new PZID.

Also, since the serving IWF of the mobile IP mobile station is changed whenever PZID is changed, a complicated mobile IP registration is additionally required.

Also, if the simple IP (SIP) mobile station is in a global IWF service area wherein one IWF is connected to a plurality of MSCs and provides the service to all packet zones of the corresponding area of MSC as shown in FIG. 5, or wherein one IWF, such as IWF3, is connected to a plurality of BSCs and provides the service to all packet zones of the corresponding area of the BSC as shown in FIG. 4, the PPP link state of the upper MS and IWF can be maintained by redetermining only the FR-VSC link between the IWF and the serving BSC or serving MSC in an area which is a different PZID area but in which the same IWF provides the service to the MS. According to a preferred embodiment of the present invention, however, the PPP link should be redetermined depending on the change of PZID only.

Finally, to collect and process the current charging information for the packet service, the IWF transfers the amount of transmitted/received data to BS/MSC after the completion of the packet service session (i.e., after the packet service of MS becomes in a nonactive state). However, if the MS which is served by BSC1 moves to BSC2 in the packet network provided with an isolate IWF that independently provides the service to the divided packet zones, such as the connection link of BSC1-IWF1 and BSC2-IWF2, a concrete method of transferring the charging information should be established.

Figure 7:
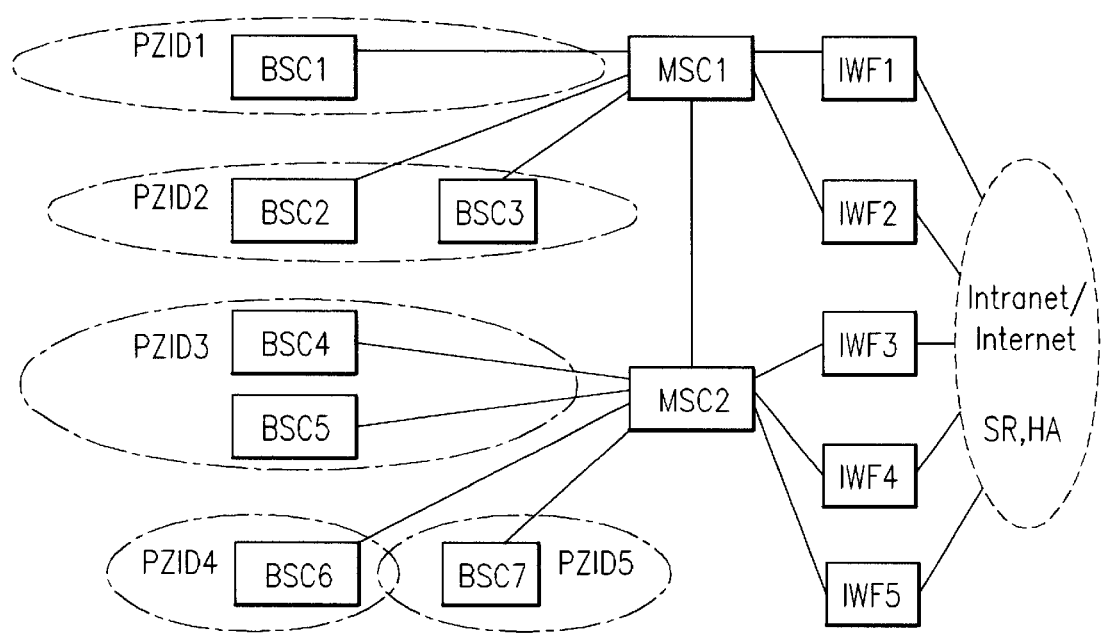
FIG. 7 is a block diagram of an MSC-IWF connection type packet data network wherein a mobile switching center and an interworking function device are connected together in a mobile radio communication network that adopts a packet zone concept according to a preferred embodiment of the present invention.

FIG. 7 illustrates the construction of a MSC-IWF connection type packet data network wherein a mobile switching center and an interworking function device are connected together in a mobile radio communication network that adopts a packet zone concept according to a preferred embodiment of the present invention. Referring to FIG. 7, it is assumed that the packet registration area (PRA) according to the present invention corresponds to the packet zone identifier (PZID) in a one-to-one manner. It is further assumed that the PRA is produced based on the IWF and a serving router (SR). In other words, the PZID corresponds to the cell area, and the PRA corresponds to the IWF/SR area. Thus, since the PRA indicates the area wherein the MS changes the serving IWF, the PRA corresponds to the IWF in a one-to-one manner.

If the infrastructure supports the mobile IP service, the SIP terminal is also influenced by the mobile IP environment. Specifically, if the MIP MS having the mobile IP client software changes its PZID, the TCP/IP connection is continuously maintained by the MIP registration request (RR)/registration acknowledgment (RA), etc. However, if the SIP MS moves from one PZID to another PZID in the infrastructure, it is connected to the serving IWF corresponding to PZID, and thus the TCP/IP connection is cut off. Accordingly, the TCP/IP connection between the SIP terminal and a new serving IWF needs to be redetermined.

Meanwhile, if the MSC1 is connected to the existing IWF1 rather than to IWF2, which is the serving IWF corresponding to PZID2, and if it is possible for MSC1 to be connected to the serving IWF1 of the existing PZID1 when the SIP terminal having no mobile IP client software moves from PZID1 to PZID2 as shown in FIG. 7, there will be achieved the same effect as supporting the mobile IP service.

Also, if the MSC1 determines its connection to the existing serving IWF1 when the MIP terminal moves in the same condition as the SIP terminal, the TCP/IP connection is continuously maintained without the MIP RR/RA procedure. Specifically, with respect to the MIP terminal, if the registration reconnection function is enabled due to the change of PZID, the MS generates the FA solicitation message after confirming the change of the PZID. At this time, the corresponding FA advertisement message includes the IP address of the FA, and thus the MS judges whether the FA is a new one. If the MS determines that the foreign agent is new, it performs the MIP RR procedure.

Accordingly, if the TCP/IP connection to the IWF1 is maintained even though the PZID is changed as the MS moves, the MIP RR is not required, and thus the time and cost for the connection in the radio section is reduced.

Figure 8:
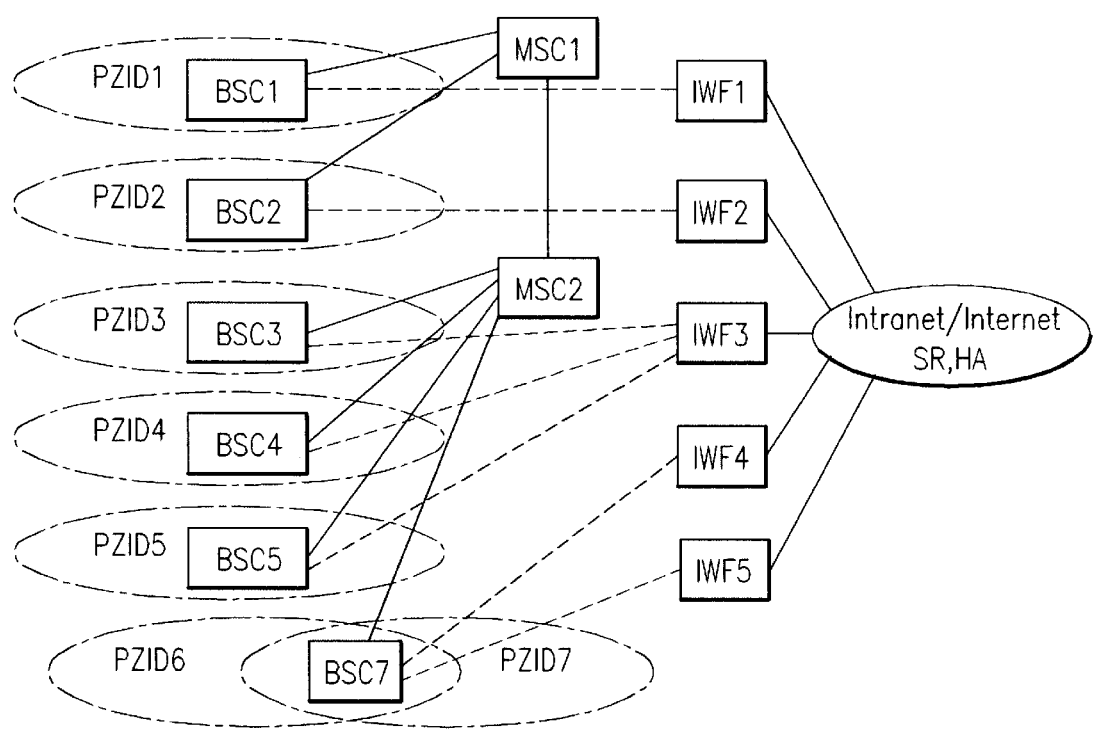
FIG. 8 is a block diagram of a BSC-IWF connection type packet data network wherein a base station controller and an interworking function device are connected together in a mobile radio communication network according to a preferred embodiment of the present invention.

FIG. 8 illustrates the construction of a BSC-IWF connection type packet data network wherein a base station controller and an interworking function device are connected together in a mobile radio communication network according to a preferred embodiment of the present invention. Referring to FIG. 8, in the BSC-IWF connection type packet data network, the packet reconnection request is performed by the MIP service only when the PZID of the MS is changed to a state where the system overhead message is broadcasted to the PZID. Accordingly, if the MS moves from PZID3, PZID4 or PZID5, the reconnection for the MIP registration of the MS is performed, and the IP network layer connection can be continuously maintained.

With respect to the SIP terminal, there is a problem that the protocol beyond the IP layer is redetermined due to the redetermination of the PPP link during the hard handoff or dormant reconnection even though the SIP terminal is connected to the same IWF as the SIP terminal moves from BSC3, BSC4 or BSC5. However, according to a preferred embodiment of the present invention, when the MSC/VLR determines the FR-SVC link between the IWF3 and BSC3, BSC4 or BSC5, it transfers the mobility information of the MS, and maintains the PPP link state between the existing MS and IWF3 without the redetermination of the PPP link. Thus, the PPP link redetermination overhead and IP layer redetermination overhead of the SIP terminal can be reduced.

The MSC connection type IWF is applied to 95A systems, and provides good link mobility for connecting MS-BSC-MSC-IWF with respect to the SIP terminal by defining a virtual PZID, without providing the PZID information as the system overhead message.

Also, the MS continuously maintains the PPP link with the IWF which is initially connected to the MS until the packet session is completed, and thus it can be served with a reliable mobile radio communication service even though it moves over the whole communication network.

When providing a PZID in the 95B system, the SIP terminal is served with the same service regardless of the system overhead message, and the MS having the mobile IP client software is provided with the same link mobility as the SIP terminal though the PZID or the hard handoff reconnection registration when the reconnection is restrained.

When the MS attempts a MIP RR by continuously maintaining the connection with the initial serving IWF in the infrastructure in a state that the system does not restrain the reconnection, the foreign agent (FA) information broadcasted by the IWF is not changed, and thus the preceding procedure for the MIP registration is not required. Accordingly, the time required for occupying the radio traffic channel (TCH) can be reduced. Additionally, the infrastructure simultaneously provides the service to the SIP and MIP terminals, and the link mobility is provided regardless of the enable or disable state of the reconnection of the MIP terminal.

Also, in operating the BSC type IWF, the link mobility between the MS and the IWF is provided in the same manner as a MSC type IWF. The detailed description thereof is as follows.

Definition of Packet Zone Identifier and Packet Registration Area

The packet zone identifier (PZID) is determined in the unit wherein the routing is always possible during the dormant reconnection whenever the MIP terminal reregisters the PPP link connection between the IWF and the MS after recognizing the change of packet zone identifier.

Accordingly, when the packet data network is the MSC-IWF matching type as shown in FIGS. 4 and 5, the PZID can be determined in the unit of the MSC at maximum, while when the network is the BSC combination type packet data network, the PZID can be determined in the unit of BSC at maximum.

Moreover, if the packet data network is the MSC-IWF connection type, the basic unit of the PZID is determined based on the BSC. To prevent the frequent reconnection of the MIP terminal, however, an area wherein a plurality of BSCs are combined may be determined as one PZID.

Where the packet data network is the IWF-BSC connection type packet data network as shown in FIG. 8, the basic unit of the PZID is determined based on the BSC. If, however, a plurality of IWFs are connected to one BSC, an area wherein a plurality of BTS are combined may be determined as one PZID.

At this time, the PZID is defined based on the cell, the PRA is defined based on IWF, and one IWF constitutes one PRA. Accordingly, the IWFID is considered to be identical to the PRAID.

MSC/VLR System Parameters and Packet Mobility Binding Parameters

If the SIP/MIP terminal is in the packet service active state, it preserves information on the IWF, which is linked thereto by the BSC/MSC, by adding tables of the PZID, the serving IWF, and the associated IWF to the VLR when it moves in a handoff or dormant state.

Thus, if the MS initially connects a packet path for the packet data service, it is connected to the IWF corresponding to the PZID. If it thereafter moves to cause the handoff, the PZID in the dormant or active state will be automatically updated (along with a paging area and registration area) in accordance with the corresponding area.

If the link connection of the serving IWF, even though it is not the associated IWF corresponding to the currently registered PZID, in the MSC or the BSC is possible, the VLR maintains the existing serving IWF identifier without any change or updating.

Accordingly, when the MS sends the packet data, the MSC connects it to the serving IWF identifier registered in the VLR, and maintains the PPP link without reconnection.

The system table and terminal packet mobility binding table to be managed by the infrastructure is defined in Table 1 given below.

TABLE 1

| PZID | SID/NID | BSC IDs | BTS IDs (Option) | AIWF ID |
|---|---|---|---|---|
| PZID# Nnnn..n2 Nnn..nn | SID/NID# | Single or Multi | Sing or Multi | Unique Single |

The packet zone identifier table (PZT) describes the identifier of the associated serving IWF corresponding to the PZID with respect to the packet zone identification defined by the system, and information on BSC and BTS serving PZID as well. The meanings of respective parameters used in the PZT will now be described.

PZID: This is an identifier uniquely given for dividing packet zones in the whole system, and is divided in the unit of the BSC or the BTS. Each PZID has an IWF identifier as an associated IWF. The packet service newly connected in PZID is connected to the associated IWF.

SID/NID: This is a system and network identifier in the area to which the PZID belongs (optional).

BSC IDs: These are BSC identifiers in the corresponding PZID area. One or a plurality of BSC IDs may exist, but only one BSC ID is possible in the BSC-IWF connection type packet network.

BTS IDs: These are BTS identifiers in the corresponding PZID area, and are used when dividing the PZID area into BTS areas.

AIWF ID: This is a default serving IWF identifier, which is connected if a certain terminal in the PZID area requests the packet service. If the terminal moves into the current PZID in a handoff state or in the dormant state while it is served with the packet service in another PZID, the packet data is transferred to the existing serving IWF in accordance with information of the packet mobility binding table of the MS.

The construction of the IWF table IWFT) of the MSC is given in Table 2.

TABLE 2

| IWF ID | PZIDs | type/BSCID | Nlist/Global list |
|---|---|---|---|
| Nnnnn1 Nnnnn2 | | | |

The IWFT is a table describing the serving PZID of all IWFIDs, the connection type of the BS/MSC, and the mutual relationship between the IWFs. The meanings of respective parameters used in the IWFT will now be described.

IWF identifier: This is an identifier uniquely given for dividing respective IWFs in the whole system, and the object IWF managed by the MSC is registered. One or a plurality of IWFs may exist.

PZID: This represents a PZID area served by the corresponding IWF. One or more PZIDs may be provided. If the PZID has no contents, i.e., has data of "0", it indicates that the corresponding IWF is simultaneously connected to a plurality of BSCs and MSCs to provide the service. In this case, a global PZID table managed by the corresponding IWF should be separately provided. At this time, if PZID=0, the following type/BSC identifier only indicates the connection type of the IWF, and the relationship between the BSC and the PZID, or the MSC and the PZID, which are actually connected together, is registered in the global PZID table. Also, a list of the BSC or the MSC connected to the corresponding IWF is registered in a Nlist.

Type/BSCID: This is used to identify the physical connection type of the corresponding IWF to the BS/MSC, which is divided into a BSC type and an MSC type. In case of the BSC type, the BSCID is added thereto.

Nlist/global: This is a list of a neighbor IWF identifier which is managed by the corresponding MSC or BSC, and to which a terminal that is served with the packet data service from the PZID served by the corresponding IWF identifier can be connected as the terminal continuously maintains the PPP link. No such a list or a plurality of lists may exist.

If the serving IWF identifier is registered in the Nlist of the associated IWF of the current PZID in the packet mobility binding table (PMBT) of the MS, and a terminal moves from another PZID to the current PZID in a handoff or dormant state, the MSC/VLR maintains the serving IWFID in the PMBT of the MS to continuously maintain the PPP link state without any change.

If the PZID=0, the BSC identifier or the MSCID list is provided instead of the IWF list, and the global IWF type is indicated. At this time, if the terminal moves to another PZID, the physical link path is changed, but the PPP link state is managed in the MS and IWF. Accordingly, in order for the user of the MS to continuously maintain the PPP link, the BSC/MSC provides the PMBT of the MS to the IWF, so as to perform the reconnection to IWF. Such a function is essential to the SIP terminal.

The global PZID table (GPT) is shown in Table 3.

TABLE 3

| | |
|---|---|
| IWFID | IWFID is an IWF identifier corresponding to GPT produced for each IWF. |
| BSCID | BSCID is registered for each connected BSC if the IWF is the BSC connection type, and has a PZID list as a sub-file. |
| MSCID | MSCID is registered for each connected BSC if the IWF is the BSC connection type, and has a PZID list as a sub-file. |

The GPT is produced for each IWFID in case that the contents of the PZID in the IWFT are "0", and the BSCID or MSCID served by the corresponding IWFID, and the PZID controlled by its BSC/MSC are registered.

In a unit system, the type of the global IWF is determined considering that the BSC-IWF connection type packet network and the MSC-IWF connection type packet network are not used together, but either of them is used.

The anchor IWF table (AIT) is shown in Table 4.

TABLE 4

| MSC identifier | IWF IDs |
|---|---|
| Mmm1 | |
| Mmm2 | |
| mmmm | |

The AIT is a table for maintaining the PPP link between another MSC and the serving IWF providing the previous packet service by the ISLP protocol even when another MSC is connected to the packet network and the terminal which is served with the packet service moves to a new MSC in a hard handoff state with its packet session maintained. The meanings of the parameters of the AIT will be described below.

MSC identifier: This is an identifier of the MSC that can perform the mutual anchoring service by interworking with another MSC connected thereto by the ISLP protocol for the packet service (in the dormant operation) of traffic data. It includes information on the identifier of the IWF connected to the corresponding MSC.

IWF IDs: This is an identifier of the IWF which serves the packet zone controlled by the corresponding MSC. It can perform the anchoring service, as it is connected by the ISLP protocol to the terminal located in the packet zone controlled by another MSC. The table as above (Table 4) is given as an option, and thus does not exist if the system does not provide the anchoring service.

The anchoring service is applied to both the SIP and the MIP terminals. The division of the SIP/MIP terminal is recognized by the originating terminal and the IWF when the packet service is initially requested, but is not recognized by its lower layer.

The packet mobility binding table (PMBT) of a mobile station (MT) is shown in Table 5.

TABLE 5

| | |
|---|---|
| MSID | a mobile terminal identifier, MIN or IMSI |
| REG_state | the current registration state of the MT: serving or anchoring |
| P_state | the current packet data service state of the MT: inactive or active (or dormant) |
| PZID | a packet zone identifier of the area where the MS is currently located |
| PRAID | a packet registration area identifier which the MS currently registers |
| AIWFID | the relationship between the SIWF and the associated IWF identifier which should serve the currently registered PRA identifier (O,N,A,G,I) |
| SIWFID | the identifier and serving type of the IWF which is currently connected to the MS by the PPP link (normal, SHO) |
| Servstate | indicating whether or not the SIWFID has performed the packet data service, and has account information |

The PMBT is a table for the link mobility management of the infrastructure for the packet data service of the MT, and is applied to the MT if the MT has the packet data service capability, regardless of the type of the SIP/MIP terminal. The meanings of respective parameters used in the PMBT will be described.

MSID: It means the identifier of MT. According to the present invention, an 15 international mobile station identifier (IMSI) or a mobile identification number (MIN) is used as MSID.

REG_state: This is used to determine whether the present state is a "serving" state or "anchoring" state if the VLR manages the table of a specified MT for the mobility management of the MT. The serving state is a state in which the packet service is provided when the VLR is registered in the VLR management area. The anchoring state is a state in which the packet service is provided when the VLR is registered in another MSC/VLR. Regarding the SIP terminal, the anchoring feature should be automatically released if the MT is shifted to the packet data service inactive state.

P_state: This is used to determine whether the MT is in the packet data service active state or in the packet data service inactive state. In the inactive state, it is additionally determined whether the MT is in the PPP dormant state or in the PPP active state.

PZID: This is used to indicate the packet zone where the MT is currently registered.

PRAID: This is used to indicate the packet registration area where the MT is currently registered.

AIWFID: This is used to indicate the default serving IWF identifier of the PRAID. If the MT in the packet inactive state is shifted to the packet active state, it is always connected to the AIWF. At this time, the state of the AIWFID, which is one of own (O), neighbor (N), anchor (A), global (G) and isolate (I), is changed in accordance with the PZID/PRAID.

SIWFID: This is used to indicate the identifier of the IWF with which the MS maintains the PPP link. Though a terminal in the active state is handed off after it is connected to the initial AIWFID, the initial AIWFID (=SIWFID) is maintained as is, and thus the PPP link mobility is supported.

Also, the serving type is divided into normal and soft handoff (SHO). Normal is used to indicate the normal connection state according to the relationship between the AIWF and the SIWF, and SHO is used to indicate the connection state in the soft handoff state, not the normal serving state according to the relation ship between the AIWF and the SIWF.

Servstate: This is used to indicate whether the SIWF has performed the service. Its state is divided into "yes" and "no". Servstate is used to decide whether to request the accounting information when the BSC/MSC is released.

Figure 9A:
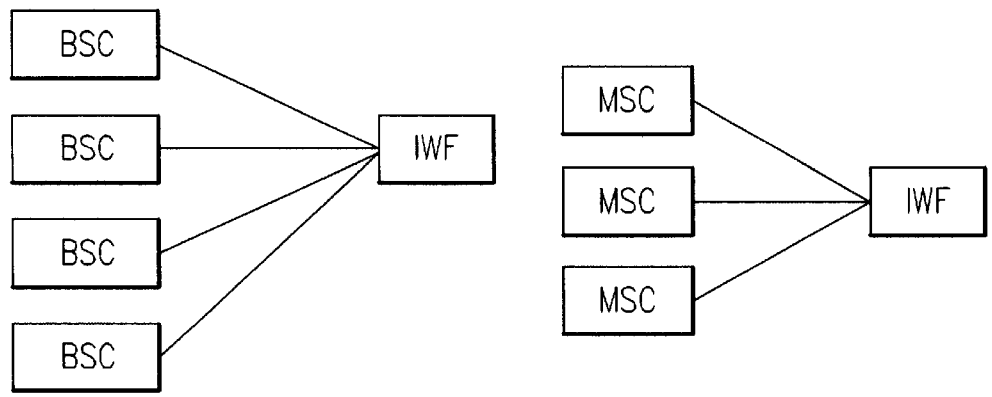
FIGS. 9a to 9c are views that illustrate the relationship between an interworking function device (AIWF), which currently provides the service, and an interworking function device (SIWF), which initially provided the service in a mobile radio communication network, according to a preferred embodiment of the present invention.
Figure 9B:
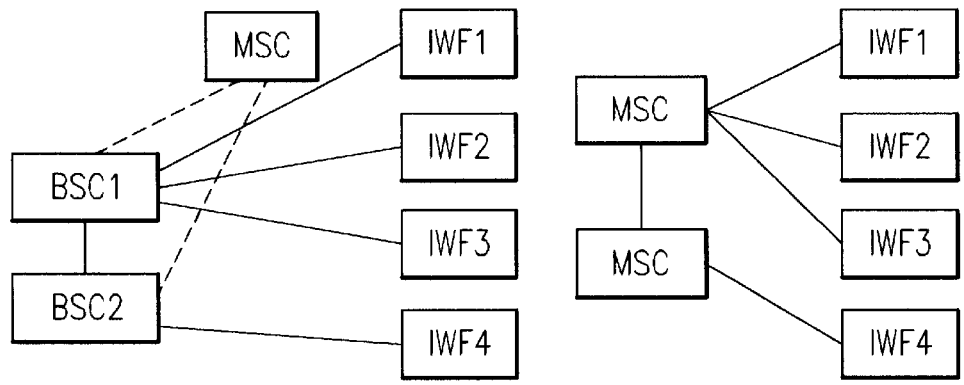
Figure 9C:
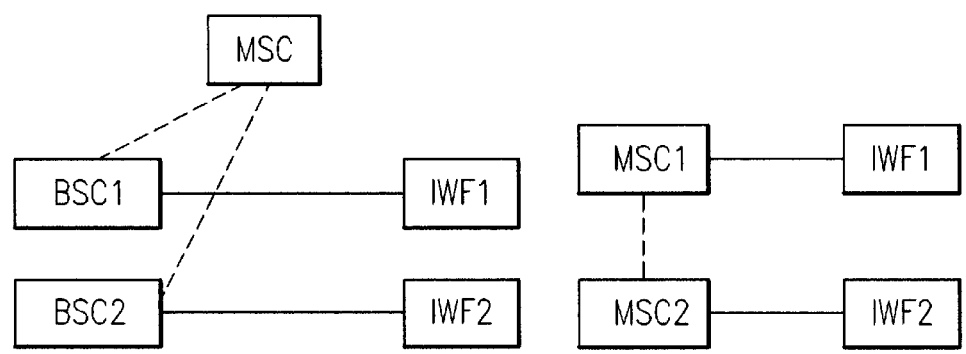

FIGS. 9a to 9c are drawings that illustrate the relationship between a first interworking function device (AIWF), which currently provides the service, and a second interworking function device (SIWF), which initially provided the service in a mobile radio communication network, according to a preferred embodiment of the present invention. Referring to FIGS. 9a to 9c, the relationship means the relationship with the associated IWF (AIWF) of PZID, which is in a radio connection with the MS if the IWF, which is currently connected to the MS through the PPP link. According to the present invention, the relationship between AIWF and SIWF is divided into global, neighbor, anchor, and isolate. If AIWF is SIWF, the relationship will be own.

Here, the relationship of global indicates that the AIWFID is equal to the SIWFID as shown in FIG. 9a, but the link through which IWF is connected to the BSC or the MSC is different. In this case, even if the MS moves from/ to the BSC or MSC area, the same IWF is connected to the MS. Thus, if the MSC/BSC maintains the relay link connection between the MS and the IWF, the PPP link state between the MS and the IWF is continuously maintained.

The relationship of neighbor indicates that AIWF such as IWF1, IWF2, and IWF3 and the SIWF are connected to the same BSC or MSC as shown in FIG. 9b. When a plurality of IWFs are operated in the packet network, the respective IWF is allocated with the PZID, and operates as the AIWF. At this time, even if the MS moves to an adjacent IWF area having the neighbor relationship while it is connected to the AIWF of a specified PZID and maintains the PPP link, the BSC or MSC connected thereto is not changed. Thus, the BSC/MSC can continuously maintain the relay link connection of the MS to the SIWF providing the packet service only by routing, so that the redetermination of the PPP link is not required.

The relationship of anchor is the relationship between IWF1 and IWF4 as shown in FIG. 9b, whereby the relay link between the MS and the IWF can be connected through the BSC or MSC of an intermediate layer. In this relationship, the relay link protocol between the serving BS/MSC connected to the MS and the anchor MSC/BSC connected to the SIWF is supported and the signaling is sent/received between the serving BS/MSC and the anchor MSC/BSC.

The relationship of isolate indicates that the relay link between the MS and the IWF cannot be connected to another IWF by a routing of the MSC or BSC as IWF1 and IWF2 as shown in FIG. 9c. Specifically, if the MS moves from the PZID area served by IWF1 to the PZID area served by IWF2, it releases the PPP link with IWF1, which is the SIWF, and redetermines the PPP link with IWF2.

IWF System Parameters and Packet Mobility Binding Parameters

In order to support the link mobility of the MT, the system table to be managed by the IWF system and the mobile binding table (MBT) of the terminal are defined as an IWF system declaration table (ISDT) in Table 6.

TABLE 6

| | |
|---|---|
| sysid | the inherent IWFID uniquely given by the system |
| domain identifier | the system area identifier served by the system, SID/NID |
| zone identifier | the associated packet zone identifier list served by the system |
| soption | service option list which can be supported by the system |

This IWFT is provided in each IWF system.

The mobile data path table (MDPT) is shown in Table 7.

TABLE 7

| port ID | MSC/BSC ID | GR ID | type | associated PZID |
|---|---|---|---|---|

MDPT describes information on the BS/MSC connected to every physical port or logical port of the mobile data path through which the IWF is connected to the BS/MSC, and is used to record PZID information of BS/MSC connected to the corresponding port. Specifically, the MDPT is a table having information related to the physical port or logical port of the IWF. The meanings of respective parameters used in MDPT are described below.

PortID: This is an identifier of the physical connection port or logical port for the mobile data path that the IWF has.

MSC/BSCID: This is an identifier of the MSC or BSC connected to the corresponding portID.

GRID: This is the number of the group to which the corresponding port belongs, and has one group identifier for each MSC/BSC. However, if the IWF is a global IWF, a plurality of group identifiers are produced.

Type: This is divided into an MSC connection type and a BSC connection type.

APZIDs: This is an identifier of the associated packet zone served by the corresponding port. According to a preferred embodiment of the present invention, a plurality of PZIDs may be provided.

The mobility binding table (MBT) (visitor list) is shown in Table 8.

TABLE 8

| | |
|---|---|
| MSID | MT identifier number (MIN or IMSI) |
| IPtype | IP option that the MS has (simple IP or mobile IP) |
| P_State | packet data service state of the MS (active, dormant, or inactive) |
| IPADDR | home IP address for the PPP link which is currently allocated to and used by the MS |
| COA type | care-of-address type (co-locate or non) |
| COA | COA which is currently allocated to and used by MS |
| HAA | current hone agent address of the MS |
| LinkSource | physical port currently connected to the data traffic of the MS (port identifier or don't care) |

The MBT is a table maintained from when the SIP MS requests the packet data service and is registered in the IWF to when the packet session is completed or to the MIP de-registration (MIP MS only, MIP lifetime out or de-registration). The meanings of respective parameters used in the MBT will be described below.

MSID: This is an mobile station identifier.

IPtype: This is an IP service option used by the terminal which requested the Internet packet data service. The IPtype determines the type of MS which is requested during the IP address request and allocation negotiated by the IWF and the MS in IPCP after LCP. It further determines whether the terminal is an SIP option terminal or an MIP option terminal according to the allocation result of the IWF. For instance, the home address of the MS is designated through the IPCP procedure according to RFC1332 (SIP) and RFC2290 (MIP, SIP), and the MS which requests a COA or CCOA will be the MIP option terminal, while the MS which requests a temporary home address or COA without its own home address will be the SIP option terminal.

P_State: This indicates the current packet data service state of the MS, and the terminal registered as the SIP option can be in the active or dormant state only. The SIP option terminal is in the active state when the traffic channel between the terminal and the BS/MSC is open, and it is in the dormant state when the traffic channel is closed. If the dormant timer terminates in the dormant state, the packet service is completed. At this time, the IWF disconnects the PPP link state, and removes the MBT of the MS.

The active/dormant state of the MIP option terminal is the same as that of the SIP option terminal, but the MIP option terminal is kept in the inactive state, different from the SIP terminal.

With respect to the MIP terminal, if the PPP link is removed by the dormant timer, the MIP terminal changes its current state to the inactive state, and then is kept in the inactive state until the IP datagram is received, or until the PPP link is opened through a mobile path. If the lifetime of the MIP terminal in the inactive state terminates or the de-registration is produced, the MBT is removed.

IPADDR: This is the home IP address for the PPP link, which the MS is currently allocated with and uses. It indicates the IP address of MS of the IP datagram transferred to the PPP link between the IWF and the MS.

If the SIP terminal is used, the home address in the sub-network identifier of the IWF is used. Also, if the MIP terminal is used, the home address in the sub-network identifier of the IWF is used if the COA is co-located, and the home IP address originally possessed by the MS is used if it is allocated with and uses the COA.

COA type: This indicates the type of the care-of-address (COA) used by the MIP type terminal. The COA type is either co-locate or non-co-locate. The co-located COA represents the state in which the IWF allocates its own sub-network host identifier address to the MS to form the IP tunnel between the terminal and the home agent (HA). In such a scenario, the MS has a de-tunnel function. The co-located COA has a drawback in that the IWF spends many IP address, but it has an advantage that the IWF does not perform the de-tunnel function.

Regarding the COA type, since the original home IP address of the MS is used as the IP address between the IWF and the MS, and the tunneling is performed only between the IWF and the HA, the IWF performs the en-capsulation or de-capsulation of the IP datagram between the IWF and the HA of the MS.

COA: This is the care-of-address which the MS is currently allocated with and uses.

CCOA is one of the IWF sub-network host identifiers, and uniquely allocated to the MS.

The COA is one of the IWF sub-network host identifiers. Since it is independently used for the IP tunneling between the MS and the HA, one IP address is allocated to all MSs.

HAA: This is the home agent address of MS or the home agent address of the MIP registered terminal, and indicates the destination address to which the IWF transmits the encapsulated IP datagram of MS.

LinkSource: This is used to indicate the physical port or logical port (the port identifier or don't care) currently connected to the data traffic of the MS. If the IWF is connected to a plurality of MSCs or BSCs/RNCs, the respective ports serve the different PZIDs and BSs/MSCs. Accordingly, the LinkSource is used for detecting the physical position of the BS/MSC where the MS is located.

The operation of the present invention as constructed above will now be described with reference to the accompanying drawings.

According to a preferred embodiment of the present invention, the VLR makes a PMBT of the MS which requests the packet data service. The MSC/BSC performs the relay link connection for connecting the MS to the IWF according to the state of the PMBT, and then performs the signaling accordingly. At this time, the updating of the PMBT is performed as shown in FIG. 10.

Figure 10:
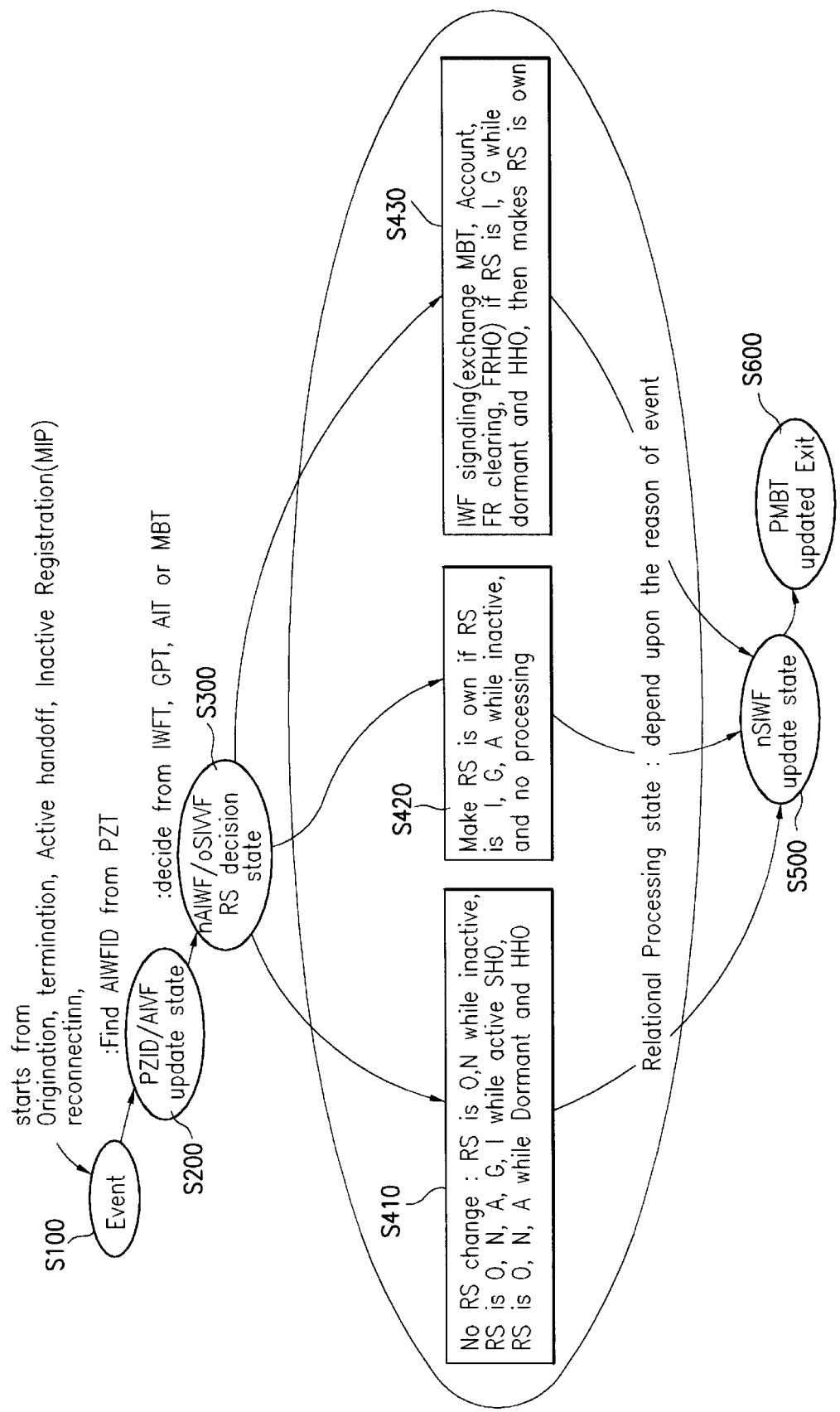
FIG. 10 is a view depicting the updating operation of an information table (control station) which a base station controller or mobile switching center manages in a mobile radio communication network according to a preferred embodiment of the present invention.

FIG. 10 is a drawing which shows the updating operation of the information table (PMBT) managed by the base station controller or mobile switching center in a mobile radio communication network according to a preferred embodiment of the present invention.

Referring to FIG. 10, the determination or updating of the PMBT is preferably performed by the registration or the reconnection of the MIP terminal caused by the start of the packet data service session or the performance of the handoff. If a first event is produced, the VLR preferably obtains PZID from the location registration information of the MS, and then obtains the AIWFID of the obtained PZID from the PZT. At this time, the BS/MSC obtains the AIWFID, and then obtains the relationship between the AIWFID and SIWFID considering the IWFT, GPT and AIT. Thereafter, the BS/MSC performs the function of matching the corresponding relationship in accordance with the packet data call state of the MS, and updates the SIWFID.

The operation of a preferred embodiment of the present invention when the respective events are produced will now be described.

1) MS Origination a. Packet Session Initiation

In the initial packet service inactive state, if the MS attempts the packet service origination, the VLR preferably identifies the PZID originated by the MS, and creates a PMBT by obtaining the AIWFID from the PZT. The MIP terminal may have a PMBT wherein the P_state is the inactive state, and the VLR identifies it. The VLR updates the SIWFID to AIWFID, makes the relationship of AIWFID own, and issues the FR-SVC setup (packet initiation). If the connection message is received from the IWF, the VLR determines that REG_state=serving, P_state=active, Servstate=yes, and SIWFID serving type=normal, respectively.

b. Dormant Reconnection

The dormant reconnection is preferably performed in a condition that when the MS attempts the packet service origination, the PMBT is created and the MS is in the dormant state. The MS compares the originated PZID with the PZID in PMBT. If the originated PZID is identical to the PZID in PMBT, the MS does not update the PMBT, but performs the FR-SVC setup connection according to the relationship with SIWFID of AIWFID.

At this time, if the relationship with SIWFID of AIWFID is own or neighbor, the dormant reconnection is performed. If, however, the relationship is anchor, the anchor reconnection is performed.

Also, if the two PZIDs are identical, the isolate or global relationship does not exist. However, if the two PZIDs are different, the AIWFID is updated, the relationship with an old SIWFID (oSIWFD) is obtained, and the reconnection according to the relationship is performed.

The determination of the relationship between the AIWF and the oSIWF as mentioned above will next be described.

First, the oSIWFID and the AIWFID are compared, and if the two identifiers are identical (i.e., if the PZIDs are different, but the AIWF and SIWF are identical), there exists a plurality of PZIDs of the IWFT or PZID of zero. At this time, if a plurality of PZIDs are registered, then one MSC or BSC serves a plurality of PZIDs, and the relationship is own.

If the oSIWFID=AIWFID, and the PZID of IWFT=0, the relationship between AIWF and oSIWF is global.

If, however, the oSIWFID does not equal AIWFID, and the oSIWFID is registered in the Nlist of AIWFID, the relationship between the AIWF and the oSIWF is neighbor.

If the oSIWFID is not in the Nlist of AIWFID, the anchor IWF table (AIT) is checked, and the existence of the MSC to which the SIWFID belongs is confirmed. If the MSC exists (i.e., if the MSC performs the anchor service), the relationship between the AIWF and the oSIWF is anchor.

If the relationship between the AIWF and the oSIWF is not anchor, the relationship is isolate.

The FR-SVC dormant reconnection and the PMBT updating will now be described, according to the relationship between AIWF and SIWF.

Own, neighbor: After the FR-SVC dormant reconnection setup is requested to SIWFID, and the reconnection is requested from the IWF, the PMBT is determined so that P_state active, servstate=yes, reg_state=serving, nSIWFID=oSIWFID, a SIWF serving type=normal, and the AIWF relationship is maintained.

Anchor: The serving MSC requests the SIWFID FR-SVC anchor reconnection setup to the anchor MSC, and the anchor MSC performs the reconnection. At this time, the serving MSC transfers the PMBT of the MS to the anchor MSC when the setup is requested.

After the completion of FR-SVC, the condition of P_state=active, servstate=yes, reg_state=anchoring, nSIWFID=oSIWFBD, SIWF serving type=normal, and relationship=anchor is maintained.

Global: The BSC/MSC releases the link with the SIWFID by requesting the FR-SVC global reconnection (global port and PMBT) setup to oSIWF. If the disconnection is requested by the SIWF (at this time, the IWF updates the linksource of the MBT by identifying the port from the PZID of the PMBT), the BSC/MSC updates nSIWFID=oSTWFID, changes the AIWF relationship to own, and then performs the own reconnection.

Isolate: The BSC/MSC performs the isolate disconnection with respect to the oSIWFID, and collects the account information from the release message.

Thereafter, the BSC/MSC updates nSIWFID=AIWFID, determines the relationship of the AIWFID and servstate to be own and no, respectively, and then performs the FR-SVC isolate reconnection (transfers the account information to IWF) with respect to the nSIWFID.

If the FR-SVC connection is completed, BSC/MSC determines that P_state=active, servstate=yes, reg_state= serving, and SIWF serving type=normal, and maintains the AIWF relationship of own.

2) IWF Initiation a. Packet Session Initiation

The IWF wherein the packet session is initialized is produced only for the MIP terminal. The IWF checks the MBT when it receives the IP datagram, identifies the linksource with IMSI, and issues the packet initiation FR-SVC setup message through the corresponding linksource.

When the setup is completed, the IWF changes P_state of the MBT to the active state, and updates IPtype, lpaddr, COA type, COA, and HAA according to the result of the PPP link establishment.

At this time, if the MBT has no IMSI, the IWF sends an un-reachable message to the IP datagram originator using ICMP.

If the IWF requests the FR-SVC packet initiation setup, the BSC/MSC identifies the VLR registration state of the first MS, and checks whether a PMBT exists. At this time, if IMSI of the first MS has been registered, but a PMBT has not been registered, the BSC/MSC may create the PMBT. If neither of them has been registered, however, the BSC/MSC sends the FR-SVC disconnection (un-reachable case) message as a reply.

However, if the PMBT exists (in case of the MIP type, it should be provided), the BSC/MSC obtains the relationship between the IWF (RIWFID) which requested the MS connection and the AIWFD of the PZID of the MS which has currently been registered in the PMBT, and performs its process according to the obtained relationship.

To process the relationship between the SIW and the AIWF, the BSC/MSC compares the RIWFID with the SIWFID of the PMBT which the MS currently has. If it is judged that the SIWFID is identical to the RIWFID, the BSC/MSC does not update the relationship between the SIWFID and the AIWFID, but performs the FR-SVC connection according to the obtained relationship.

Here, if the SIWFID and the RIWFID are identical, there exists no isolate, global, or anchor relationship in the IWF where the packet service origination is initialized.

If the SIWFID of the PMBT is different from the RIWFID, it is judged that the PMBT of the MS has been updated, but the packet service initiation of the MS has been performed by the IWF before the link binding update (mobile IP registration) between the MS and the nSIWF is performed, so that the BSC/MSC sends the disconnection (incomplete link update unreachable) message to the IWF.

Specifically, if the MIP MS in the packet service inactive state moves and changes its PZID, the VLR updates the PMBT in such a manner that it maintains the link as SIWF when the neighbor and own relationship is determined, while it always updates SIWFID to AIWFID and changes the relationship to own when the isolate, global, and anchor relationship is determined.

The type of the terminal is not identified at its initial registration, but is identified when the FR-SVC disconnection and PPP link closure obtains the MBT from the IWF. If the terminal is identified as the MIP terminal, the PMBT is maintained without deletion.

At this time, if the relationship is determined as own, the MIP MS identifies the change of the PZID, and performs the registration of the MIP terminal in the bound IWF by performing the MIP registration connection only when it is enabled.

The FR-SVC setup and the PMBT updating according to the relationship are performed only when the relationship is own or neighbor, and the connection is performed as a reply.

When the FR-SVC is completed, the VLR completes the setup of the PMBT. At this time, the VLR determines that P_state=active, reg_state=serving, and servstate=yes, and determines PZID, PRAID, AIWFID, SIWFID, and the related terms accordingly.

b. Dormant Reconnection

The IWF wherein the packet reconnection is initialized corresponds to both the MIP and SIP terminals, and the dormant reconnection is performed when the IP datagram to be transmitted to the terminal in the dormant state is received from the Internet side.

The IWF checks the MBT when receiving the IP datagram, identifies the linksource with IMSI, and issues the FR-SVC reconnection message through the corresponding linksource. When the setup is completed, the IWF changes P_state to an active state, and updates IPtype, Ipaddr, COA type, COA and HAA according to the result of the PPP link establishment. At this time, if the MBT has no IMSI, the IWF sends an un-reachable message to the IP datagram originator using ICMP.

If the IWF requests the FR-SVC packet initiation setup, the BSC/MSC identifies the VLR registration state of the first MS, and checks whether a PMBT exists. At this time, if no PMBT exists, the BSC/MSC sends the FR-SVC disconnection (un-reachable case) message as a reply. If, however, a PMBT exists (in case of the MIP type, it should be provided), the BSC/MSC obtains the relationship between the IWF (RIWFID) which requested the MS connection and the AIWFID of the PZID of the MS which has currently been registered in the PMBT, and performs its process according to the obtained relationship.

Then, the BSC/MSC compares the RIWFID with SIWFID of the PMBT which the MS currently has. If it is determined that SIWFID of the PMBT is identical to RIWFID, the BSC/MSC does not update the relationship between SIWFID and AIWFID, but performs the FR-SVC connection according to the obtained relationship. If, however, SIWFID and RIWFID are identical, there exists no isolate, global, or anchor relationship in the IWF wherein the packet reconnection is initialized.

If the SIWFID of the PMBT is different from RIWFID, it is judged that the PMBT of the MS has been updated from isolate (mobile IP registration) or global (FR-SVC link handoff) to own, but the packet service initiation of the MS has been performed by the IWF before the link binding update (mobile IP registration) between the MS and the nSIWF is performed, so that the BSC/MSC sends the disconnection (incomplete link update unreachable) message to the IWF.

For instance, if the MIP MS which is the packet service dormant moves and changes its PZID, the VLR updates the PMBT. At this time, if the relationship is determined to be neighbor, own, and anchor, it maintains the link as SIWF. If, however, the relationship is determined to be isolate or global, the FR-SVC isolated disconnection is performed between the MS and the isolated IWF, or the FR-SVC global disconnection is performed between the MS and the global IWF. Then, the SIWFID is updated with AIWFID, and the relationship is changed to own.

The FR-SVC setup and the PMBT updating according to the relationship are performed only when the relationship is own, neighbor, or anchor, and the connection is performed as a reply.

When the FR-SVC is completed, the VLR completes the setup of PMBT. At this time, VLR determines that P_state= active, reg_state=serving, and servstate=yes, and determines PZID, PRAID, AIWFID, SIWFID, and the related terms accordingly.

3) Soft Handoff (SHO)

According to a preferred embodiment of the present invention, the mobile radio communication network should recognize the soft handoff (SHO). In the state that the MS simply experiences SHO, it does not affect the link binding of BSC-MSC-IWF. However, if the MS being served with the packet service changes the boundary of the PZID while it moves in the soft handoff state, the VLR should update the PMBT, and change AIWFID according to the PZID as shown in the PMBT update state diagram of FIG. 10. The updating of the PMBT is performed as follows.

First, the relationship between oSIWFID and AIWFID is obtained as described above. The obtainable relationship (in the soft handoff state between MSCs) will be isolate or global. At this time, other contents of the PMBT are maintained, the AIWFID relationship is updated accordingly, and the serving type of SIWFID is updated with soft handoff.

4) Hard Handoff (HHO)

According to a preferred embodiment of the present invention, the mobile radio communication network should recognize the hard handoff (HHO). If the MS experiences the hard handoff, the MS may have the relationship between SIWFID and isolate, and between global and anchor, passing through diverse soft handoffs even if the PZID is identical. This may cause a problem in the link binding of BSC-MSC-IWF. Accordingly, the link binding with the previous SIWFID should be updated simultaneously with the hard handoff irrespective of the change of the PZID.

At this time, if the PZID is changed, the PZID and AIWFID in the PMBT is updated, matching with the registration area where the MS is currently located, and the relationship between the AIWFID and the oSIWFID is obtained in the manner as described above. If the PZID is not changed, the existing AIWFID relationship is used as it is.

The BSC/MSC performs the following operation according to the determined relationship.

a) Own: The BSC/MSC maintains other contents of the PMBT as they are, determines the SIWFID serving type to be normal, and connects the link between the serving BSC of the MS and SIWFID.

b) Neighbor: The BSC/MSC maintains other contents of the PMBT as they are, determines the SIWFID serving type to be normal, and connects the link between the serving BSC of the MS and SIWFID.

c) Anchor: The BSC/MSC determines that reg_state= anchoring, and SIWFID serving type=normal in the PMBT, and connects the link between the serving BSC, serving MSC, anchor MSC, and SIWFID. At this time, the link connection will be one of the infrastructure without signaling with the SIWF.

d) Global: The serving MSC/BSC issues the FR-SVC global disconnection (including PMBT) setup message through the MSC/BSC connected to SIWFID. The SIWF detects the PZID of the MS from the PMBT, updates the linksource of the MBT, and sends the disconnection message.

Thereafter, the VLR changes the AIWF relationship of PMBT to own, and then the serving MSC/BSC issues the AIWFID FR-SVC global reconnection setup message.

The IWF recognizes the handoff of the FR link, and performs only the link binding. If the connection is completed, the IWF changes the SIWFID serving type to normal with other contents of the PMBT maintained. At this time, SIWFID is identical to the original one.

e) Isolate: The serving BSC/MSC performs the isolate disconnection with oSIWFID, and receives the account information in the release message. Thereafter, the serving BSC/MSC updates nSIWFID with AIWFID, determines the AIWFID relationship and servstate to be own and no, respectively, and then performs the FR-SVC isolate reconnection (i.e., transfers the account information to IWF) with nSIWFID.

When the FR-SVC connection is completed, the serving BSC/MSC determines that servstate=yes, reg_state=serving, and SIWF serving type=normal in PMBT, and maintains the AIWF relationship to be own.

IWF receives FR-SVC, it creates MBT by judging other information excepting the account information as a new packet session, and restart the PPP link establishment.

5) FR-SVC Clearing for Dormant

When the PMBT state is shifted to the dormant state by the timeout of the RLP, the BSC/MSC performs the release of the FR-SVC link with SIWF.

If the terminal is served with the packet service by the soft handoff (SHO), the intermediate MSCs in the anchor relationship may not have a PMBT.

At this time, the MSC/BSC confirms the PZID location of the MS, and if the identified PZID is different from the PZID of the PMBT, it updates AIWFID, and then obtains the relationship between AIWFID and oSIWFD in the manner as described above. Meanwhile, if the PZID location of the MS is identical to the PZID of the PMBT, the MSC/BSC maintains the existing relationship in PMBT, and performs the FR-SVC clearing and PMBT updating as follows.

Own: MSC/BSC determines that P_state=dormant, and SIWFID serving type=normal in PMBT, and performs the FR-SVC dormant disconnection. The IWF replies with the release message, and determines that P_state=dormant in the MBT.

Neighbor: The MSC/BSC determines that P_state=dormant, and SIWFID serving type=normal in PMBT, and performs the FR-SVC dormant disconnection. The IWF replies with the release message, and determines that P_state=dormant in MBT.

Anchor: The MSC/BSC identifies the SIWFID serving type, and if the SIWFID serving type is soft handoff, it determines that reg_state=anchoring, SIWFID serving type=normal, and P_state=dormant in the PMBT. The serving MSC/BSC performs the FR-SVC dormant disconnection with the anchor MSC/BSC, and respective intermediate nodes store the PMBT. The IWF replies with the release message, and determines that P_state=dormant in MBT.

Global: The MSC/BSC determines that P_state=dormant, and the MSC/BSC connected to SIWFID performs the FR-SVC global dormant disconnection (including PMBT). At this time, the IWF updates the link source of the MBT from the PZID of the PMBT, and performs the release operation. The MSC/VLR changes the AIWFID relationship to own, and determines that SIWF serving type=normal.

Isolate: The MSC/BSC determines that P_state=dormant in PMBT, and MSC/BSC connected to oSIWFID requests the FR-SVC isolate dormant disconnection.

IWF replies with the release message including the account information, and clears the MBT of the MS. The MSC/VLR changes the AIWFID relationship to own, and determines that nSIWFID=AIWFID, and servstate=no in the PMBT.

Then, the MSC/BSC preferably transfers the account information to the IWF by requesting the FR-SVC isolate dormant setup (including account information and PMBT) to nSIWFID. IWF creates MBT to maintain the account information, and replies with the disconnection message to close the link.

6) Dormant PZID Change

In the dormant state, as the MS moves, MSC/VLR preferably continuously updates the link biding table, i.e., PMBT, for the effective link connection between the MS and the IWF.

If the PZID is changed, the VLR obtains the AIWFID of the PZID from the PZT, obtains the relationship between the AIWFID and the oSIWFID in the manner as described above, and operates according to the following relationship.

Own: No operation

Neighbor: The VLR updates the PZID, AIWFID, and AIWFID relationship=neighbor only.

Anchor: The VLR updates the PZID and AIWFID, and determines that AIWFID=anchor, and reg_state=anchor, and makes the anchor information preserved in the intermediate node (MSC/BSC) by transferring the PMBT of the MS to the serving MSC/BSC through the anchor MSC/BSC.

Global: The VLR updates the PZID and the AIWFD, and the MSC/BSC connected to SIWFID performs the FR-SVC global dormant disconnection (including PMBT). IWF updates the link source of the MBT from the PZID of the PMBT and releases it. The MSC/VLR changes the AIWFID relationship to own.

Isolate: The MSC/BSC connected to the oSIWFID requests the FR-SVC isolate dormant disconnection. IWF preferably replies with the release message including the account information, and clears the MBT of the MS. The MSC/VLR changes the AIWFID relationship to own, and determines that nSIWFID=AIWFID, and servstate=no in the PMBT.

Then, the MSC/VLR transfers the account information to the IWF by requesting the FR-SVC isolate dormant setup (including account information and PMBT) to nSIWFID. The IWF creates the MBT, maintains the account information, and replies with the disconnection message to close the link.

7) Dormant PPP Link Closure

The dormant PPP link closure is performed such that the PPP link disconnection is performed by the timeout of the dormant time, and concludes the packet service session. According to a preferred embodiment of the present invention, the dormant PPP link closure is briefly divided into the closure by the MSC/BSC and the closure by the IWF.

a) MSC/BSC-initiated Closure

If the MS cannot be served with the packet service any more, the MSC/VLR issues the PPP link layer connection closure setup message to the current SIWFID of the PMBT as CALL_TYPE=0x02 (to request/inform the dormant link layer connection closure) of a SETUP_INFO segment, and the IWF replies with a release complete message.

At this time, the IWF transfers the MBT and account information to the MSC/VLR, so that the MSC/VLR can identify the billing and the IP type of the MS. Also, the IWF removes the MBT for the SIP, and changes and maintains the MBT for the MIP to be P_state=inactive. The VLR also maintains the PMBT for the MIP identified from the MBT to be in the inactive state, and removes the PMBT for SIP.

b) IWF-initiated Closure

The IWF preferably closes the packet service session when the MS requests the PPP link closure or the PPP time is out. If the MS requests the PPP link closure, the IWF performs the PPP disconnection, and then issues the PPP link layer connection closure setup message to the MSC/BSC as CALL_TYPE=0x02 (to request/inform the dormant link layer connection closure) of SETUP_INFO segment.

At this time, the IWF transfers the MBT and account information to the MSC/VLR, so that the MSC/VLR can identify the billing and the IP type of the MS. Also, the IWF removes the MBT for SIP, and changes and maintains the MBT for the MIP to be P_state=inactive. The VLR also maintains the PMBT for the MIP identified from the MBT to be in the inactive state, and removes the PMBT for the SIP.

Packet Data Call Processing Scenarios

The basic packet data service call processing procedures in the IWF-BSC connection type and the IWF-BSC connection type packet networks according to a preferred embodiment of the present invention will now be described.

In order for the MIP to be served with the mobile packet service, the PZID concept should be introduced. The overhead message enables the determination of an area covered by multiple IWF and BSC/BTS without the PZID broadcasting.

FIGS. 11 to 15 are time sequence diagrams depicting various procedures which occur during the packet data service in a mobile radio communication network according to a preferred embodiment of the present invention.

Figure 11:
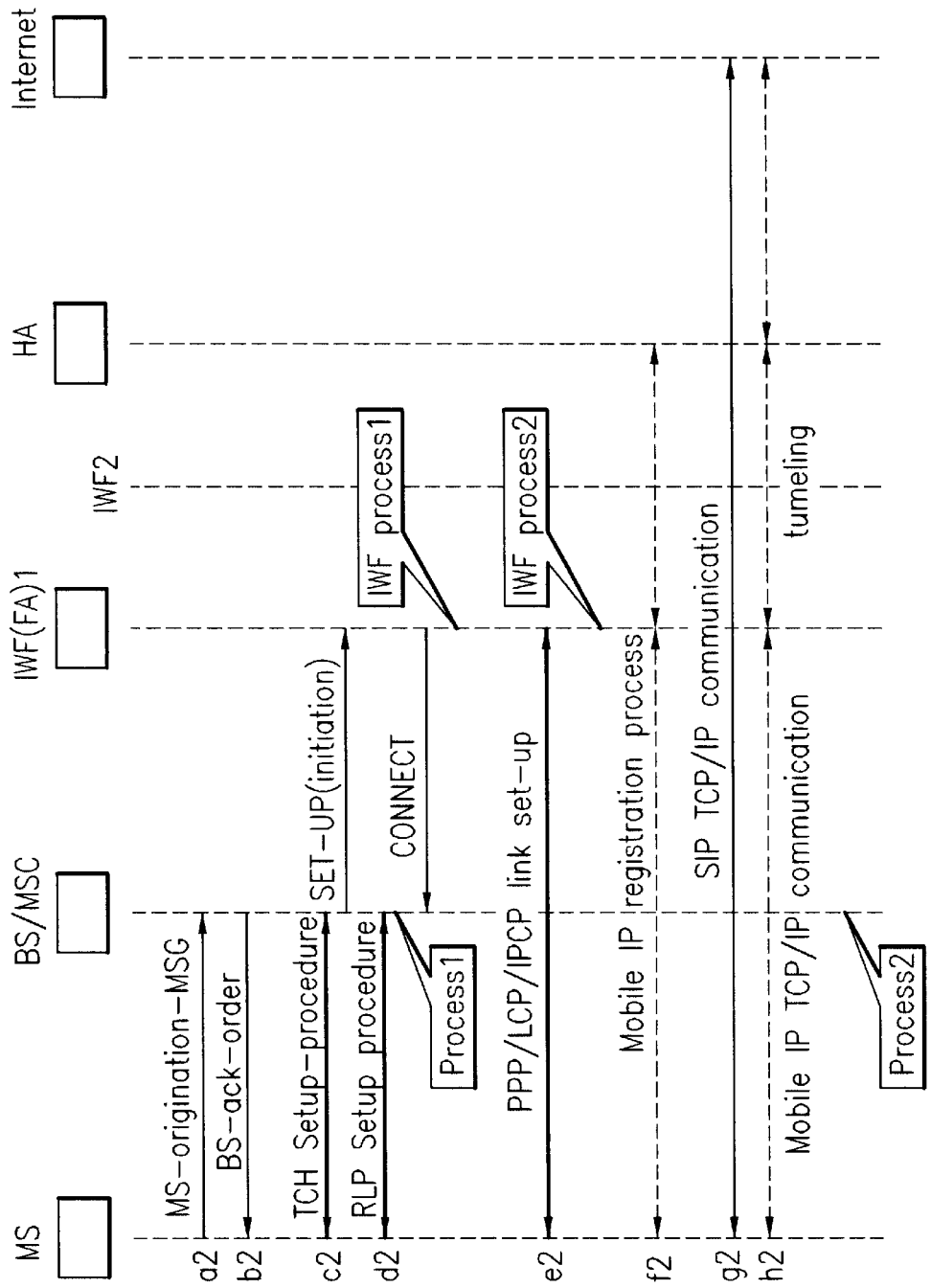
FIGS. 11 to 15 are time sequence diagrams depicting various procedures produced during the packet data service in a mobile radio communication network according to preferred embodiments of the present invention.

Referring to FIG. 11, if the MS originates a call to the MS/MSC as a packet service option (step a2), the BS/MSC determines the identification of the MS and whether to permit the packet service. It then permits the radio connection (step b2). Thereafter, the BS/MSC preferably sets up the packets to the associated IWF of the corresponding PZID (steps c2 and d2). At this time, the BS/MSC makes and maintains a PMBT of the corresponding terminal in the VLR through process 1. The IWF creates the MBT link source and IMSI using IMSI through process 1. At this time, if the terminal is the MIP type, the MBT (ink source and IMSI) may exist.

Thereafter, the PPP link between the terminal and IWF is set-up (step e2), and the SIP or MIP terminal type is determined according to the client software of the MS. Thus, the BS/MSC cannot identify the IP type of the terminal until the type of the terminal is determined.

Thereafter, the IWF preferably completes the construction of the MBT of the MS through process 2, and if the MS is the MIP type, the IWF performs the registration of the MIP terminal, and in case of COA, the IWF relays the call(step f2). If the terminal is the SIP type, the procedure is performed without the registration of the terminal. Then, after the registration of the MIP terminal is completed, an Internet communication is performed (step h2).

Soft Handoff

In the data active PPP state, if the MS performs the soft handoff for changing the PZID, the VLR changes the PZID, PRAID and AIWFID of PMBT according to the soft handoff, and updates the relationship between the AIWFID and SIWFID. Also, the VLR maintains the SIWFID, and changes only the serving type to the soft handoff through process 2 of FIG. 11.

Hard Handoff

Figure 12:
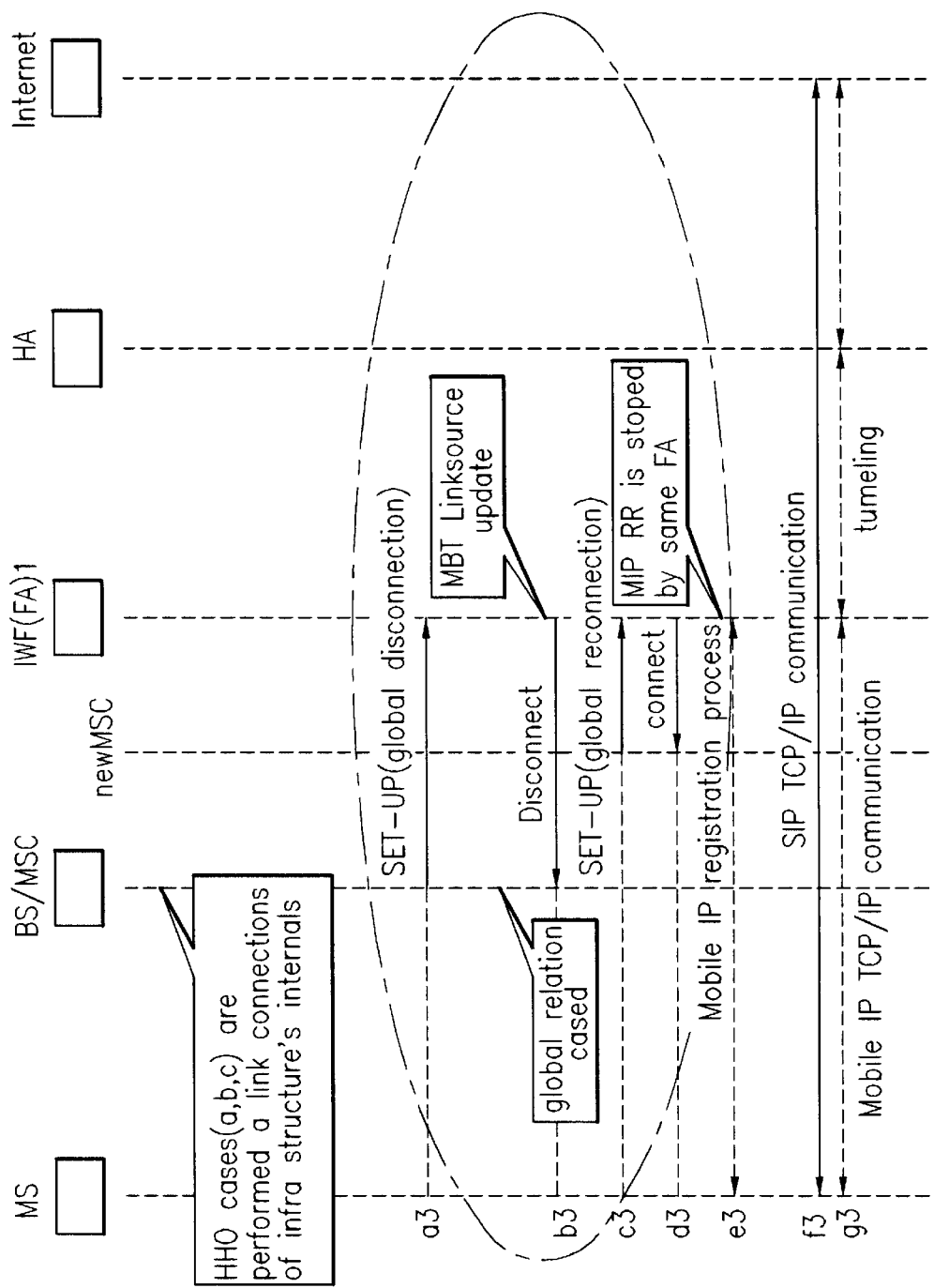

As shown in FIG. 12, if the MS performed the hard handoff in the active PPP state, the process is divided into the following four cases, which can be produced from the relationship between the AIWFID and SIWFID in the MSC connection type network irrespective of the change of the PZID.

a) Own: The BSC/MSC determines the SIWFID of the PMBT to be normal only, while it maintains other contents of the PMBT without change. It also connects the link between the serving BSC and SIWFID.

b) Neighbor: The BSC/MSC maintains other contents of the PMBT without change, determines the SIWFID serving type to be normal, and connects the link between the serving BSC of the MS and the SIWFID.

c) Anchor: The BSC/MSC determines that reg_state=anchoring, and SIWFID serving type=normal in the PMBT, and connects the link between the serving BSC, serving MSC, anchor MSC, and SIWFID.

In the above three cases, the link connection will be one of the infrastructure without signaling with the SIWF.

d) Global: The serving MSC/BSC issues the FR-SVC global disconnection (including the PMBT) setup message through the MSC/BSC connected to SIWFID. The SIWF detects the PZID of the MS from the PMBT, updates the link source of the MBT, and sends the disconnection message.

At this time, the VLR changes the AIWF relationship of the PMBT to own, and then the serving MSC/BSC issues the AIWFID FR-SVC global reconnection setup message. The IWF recognizes the FR-link handoff, and performs only the link binding.

If the connection is completed, the IWF preferably changes the SIWFID serving type to normal with other contents of the PMBT maintained. At this time, the SIWFID is identical to the original one.

For all the cases as described above, the registration of the MIP MS can be attempted according to the change of the PZID. If the MS receives the foreign agent advertisement sent in response to the foreign agent solicitation issued by the MS, it identifies the corresponding foreign agent, and discontinues the registration of the MIP MS. Accordingly, the registration procedure of the MIP MS is omitted according to a preferred embodiment of the present invention.

FR-SVC Closure for Dormant

Figure 13A:
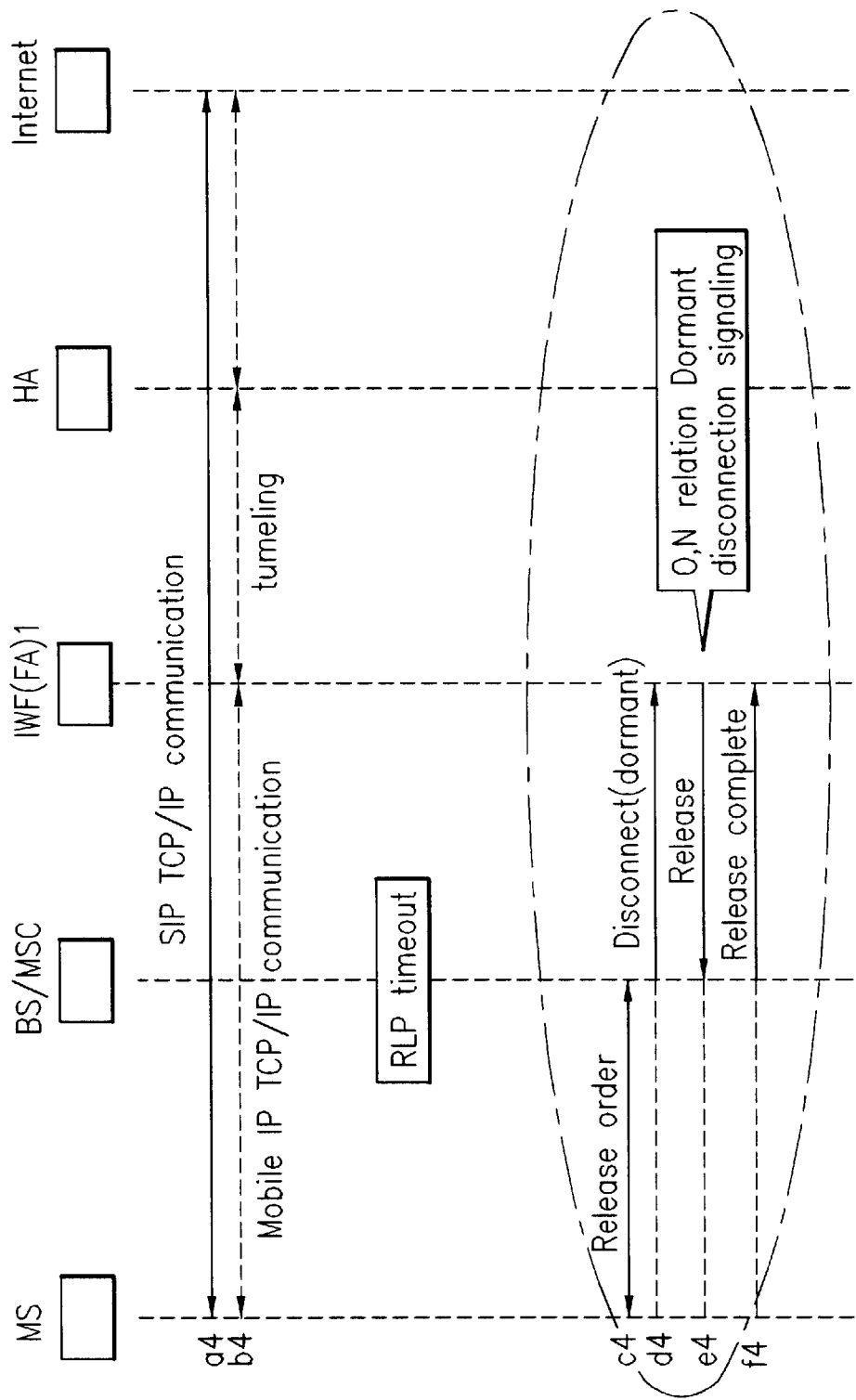
Figure 13B:
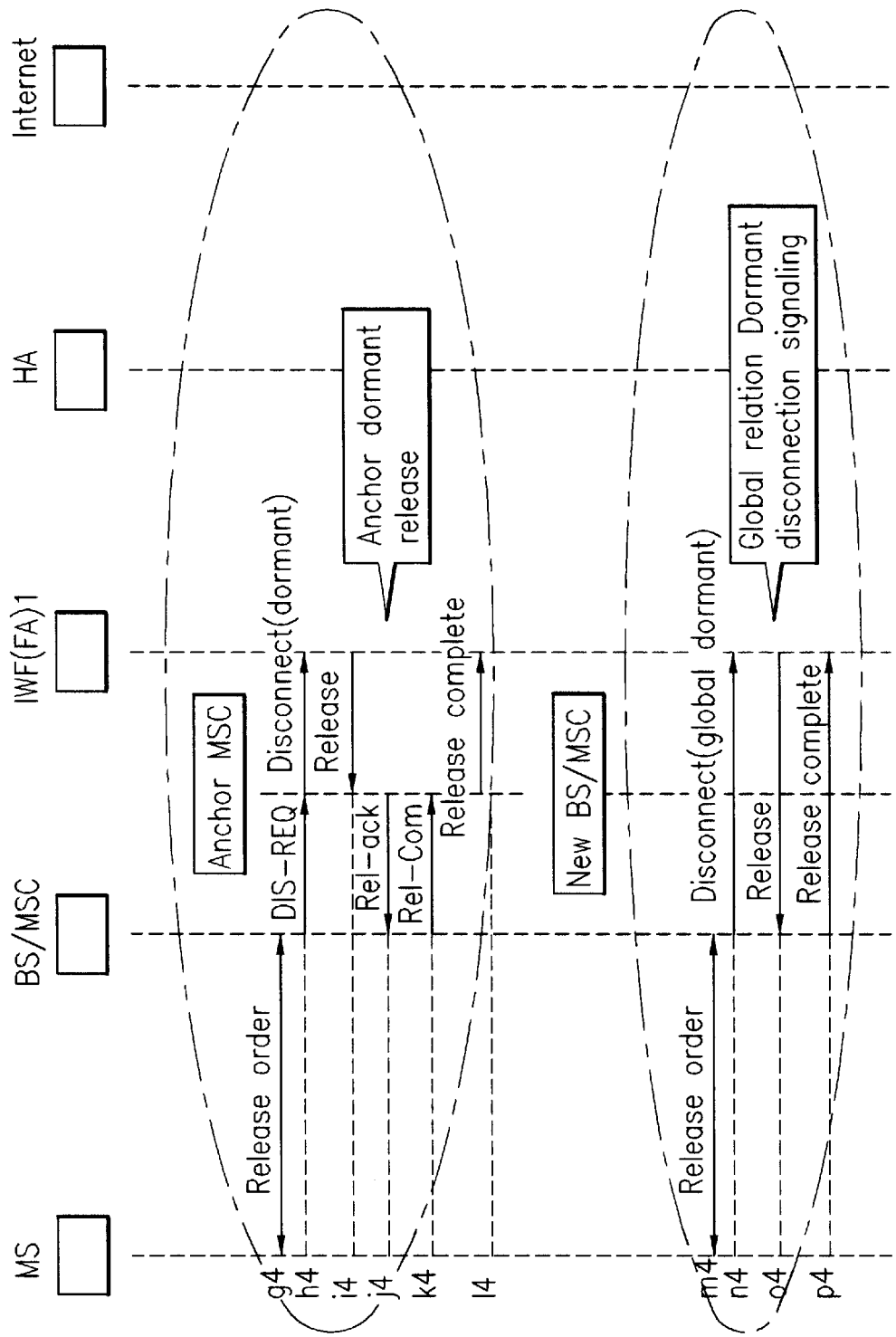

Referring to FIGS. 13a and 13b, if no packet data is transmitted through the RLP for a predetermined time, the BS/MSC preferably releases the traffic channel of the radio section and the link of the IWF section, and shifts the PPP link state to the dormant active state.

At this time, the VLR preferably determines the P_state of the PMBT to be the dormant state, and IWF determines P_state to be the dormant state. Four cases may be produced in accordance with the relationship between AIWFID and SIWFID at the dormant point, and the following three cases exist in view of the signal between the VLR and the IWF.

a) Own, Neighbor: The MSC/BSC determines that P_state=dormant, and SIWFID serving type=normal in the PMBT, and performs the FR-SVC dormant disconnection. The IWF replies with the release message, and determines that P_state=dormant in the MBT.

b) Anchor: The MSC/BSC identifies the SIWFID serving type, and if the SIWFID serving type is soft handoff, it determines that reg_state=anchoring, SIWFID serving type=normal, and P_state=dormant in the PMBT. The serving MSC/BSC performs the FR-SVC dormant disconnection with the anchor MSC/BSC, and respective intermediate nodes store the PMBT. The IWF replies with the release message, and determines that P_state=dormant in the MBT.

c) Global: The MSC/BSC determines that P_state=dormant, and the MSC/BSC connected to SIWFID performs the FR-SVC global dormant disconnection (including PMBT). At this time, the IWF updates the link source of the MBT from the PZID of the PMBT, and performs the release operation. The MSC/VLR changes the the AIWFID relationship to own, and determines that SIWF serving type=normal.

Hard Handoff During Dormant

Figure 14A:
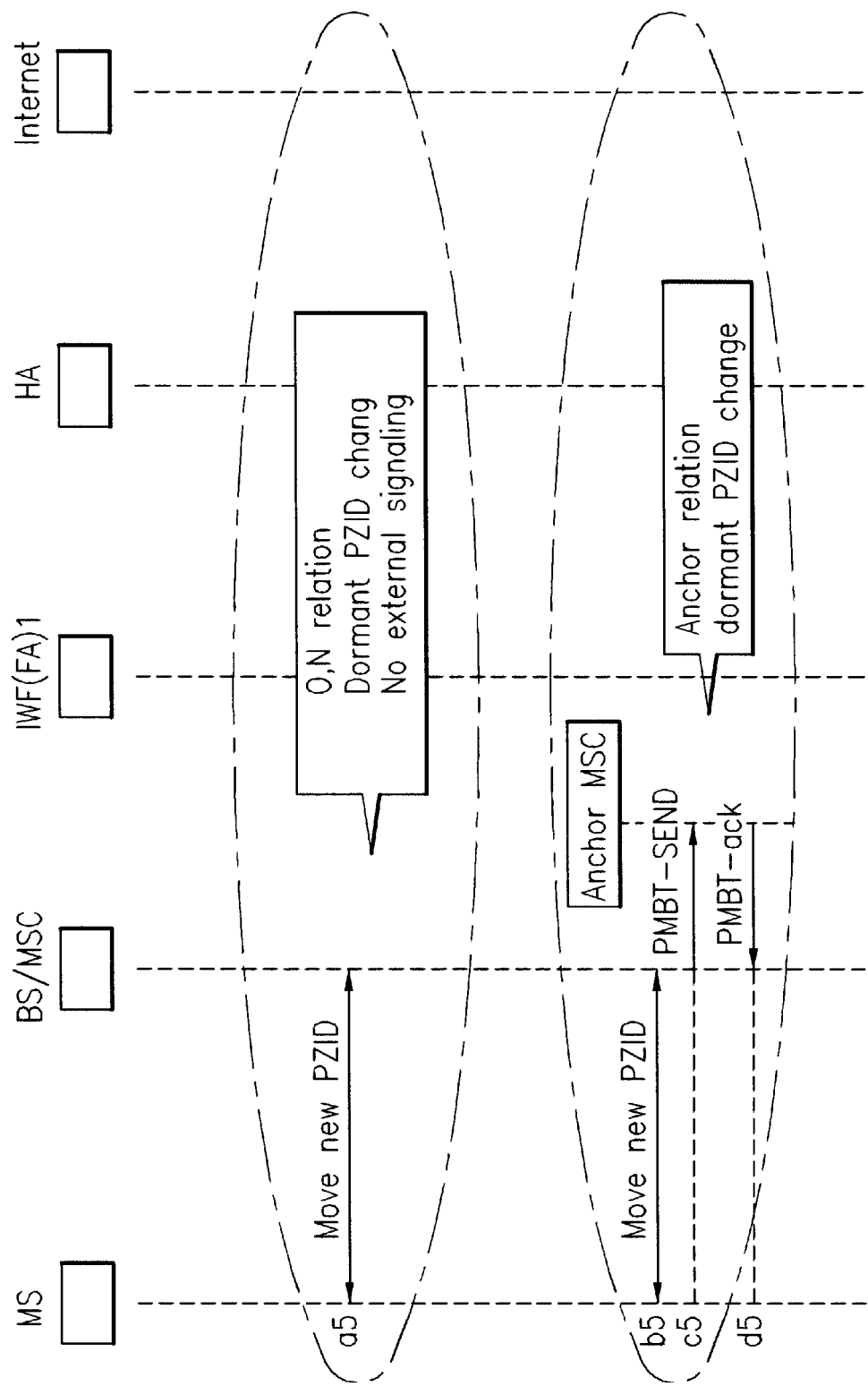
Figure 14B:
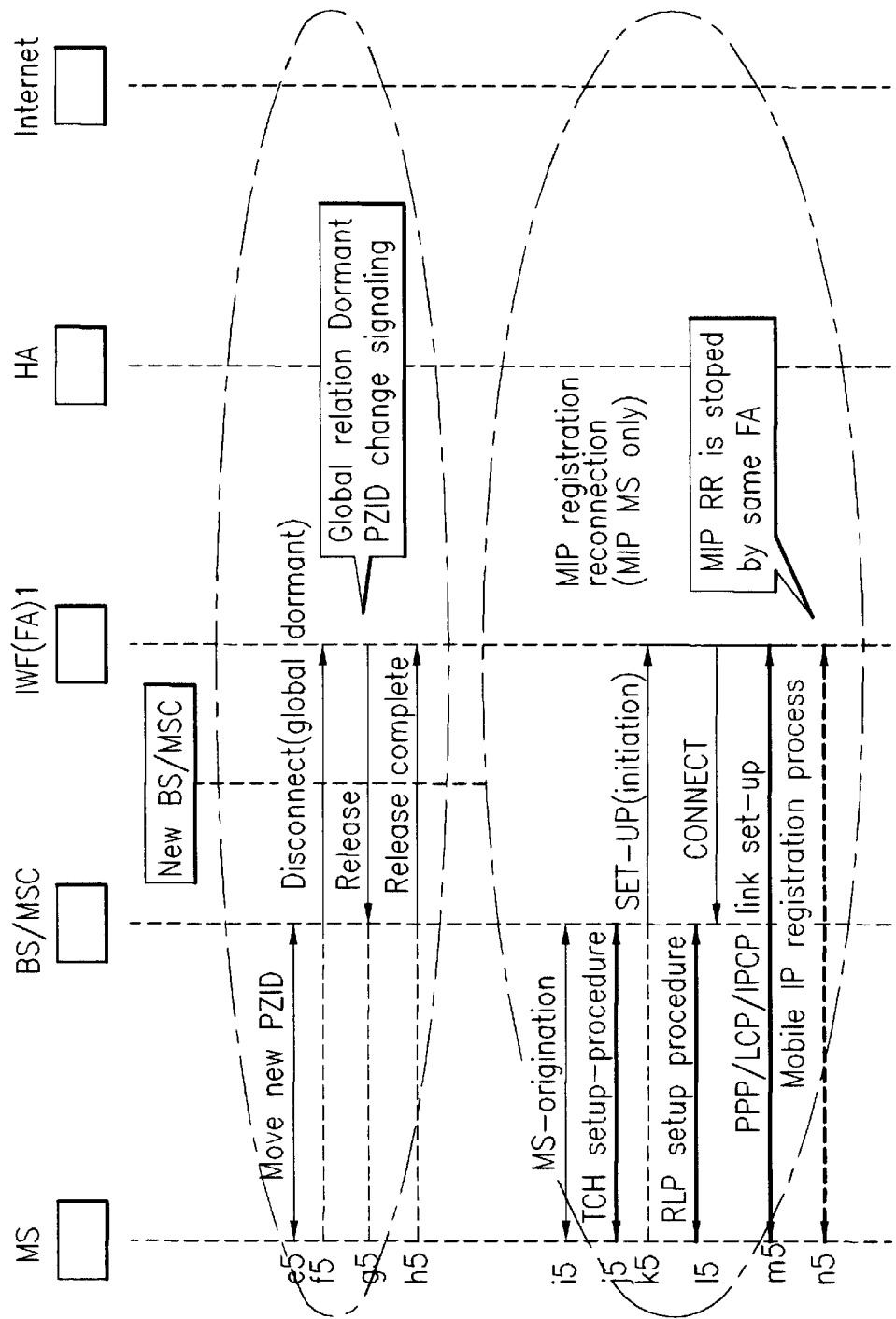

Referring to FIGS. 14a and 14b, as the MS moves in the dormant state, the MSC/VLR continuously updates the link biding table, i.e., PMBT, for the effective link connection between MS and IWF. If the PZID is changed, the VLR obtains the AIWFID of the PZID from the PZT. It also obtains the relationship between the AIWFID and the oSI-WFID in the manner as described above, and operates according to the following relationship.

a) Own: No operation b) Neighbor: The VLR updates the PZID, AIWFID, and AIWFID relationship=neighbor only.

c) Anchor: The VLR updates the PZID and AIWFID, and determines that AIWFID relationship=anchor, and reg_ state=anchor, and makes the anchor information preserved in the intermediate node (MSC/BSC) by transferring the PMBT of the MS to the serving MSC/BSC through the anchor MSC/BSC.

d) Global: The VLR updates the PZID and AIWFID, and MSC/BSC connected to SIWFID performs the FR-SVC global dormant disconnection (including PMBT). The IWF updates the link source of the MBT from the PZID of the PMBT and releases it. MSC/VLR changes the AIWFID relationship to own.

According to the preferred embodiment of the present invention as described above, since the PPP link connection between the SIP/MIP terminal and the IWF initially connected thereto with the packet session can be maintained only by updating the PMBT in the infrastructure, a seamless handoff can be supported even without the support of the mobile IP client software, and this enables the packet data communication securing the mobility.

For instance, with respect to the MIP terminal, as the MS moves, the IWF detects the PZID change of the MS, and then if the MIP registration reconnection function is enabled, the PZID is changed and the reconnection is requested. At this time, the MS requests the FA solicitation, and receives the FA advertisement message. At this time, since the same IWF connection is maintained by the mobile link binding support of the infrastructure, no additional registration of the MS is required.

Reconnection of the Initialized Mobile Station

Figure 15:
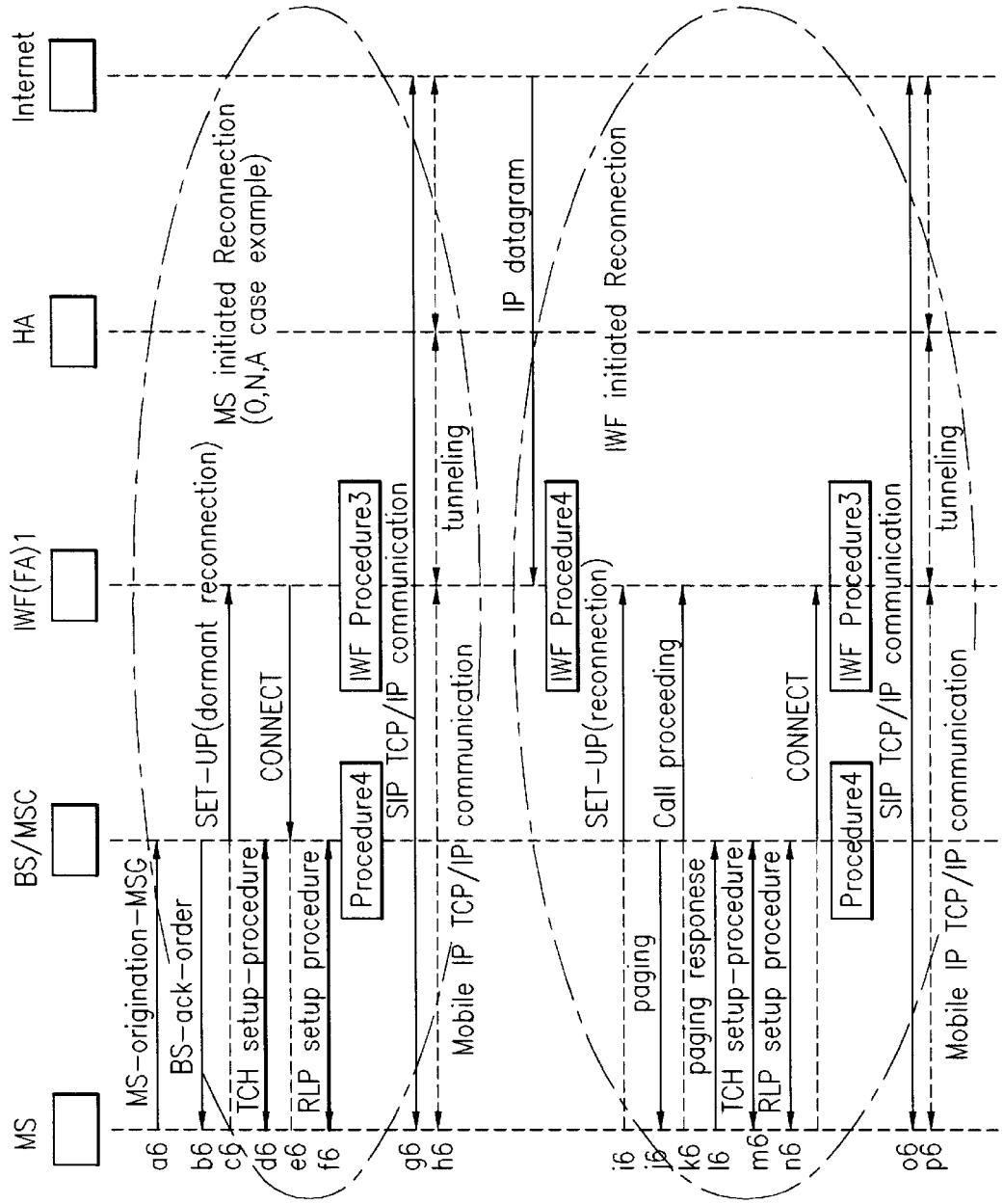

Referring to FIG. 15, the FR-SVC setup connection is preferably performed in accordance with the relationship between the AIWFID and the SIWFID. Specifically, if the relationship between AIWFID and SIWFID is own or neighbor, the dormant reconnection is performed, while if the relationship is anchor, the anchor reconnection is performed. The FR-SVC dormant reconnection and the PMBT updating according to the relationship between AIWFID and SIWFID are performed as follows.

a) Own, neighbor: The FR-SVC dormant reconnection setup is requested to SIWFID, and the reconnection is requested from the IWF.

b) Anchor: The serving MSC requests the SIWFID FR-SVC anchor reconnection setup to the anchor MSC, and the anchor MSC performs the reconnection.

At this time, the serving MSC transfers the PMBT of the MS to the anchor MSC when the setup is requested.

c) Global: The BSC/MSC releases the link with SIWFID by requesting the FR-SVC global reconnection (global port and PMBT) setup to the oSIWF. If the disconnection is requested by the SIWF (at this time, IWF updates the link source of MBT by identifying the port from PZID of PMBT), the BSC/MSC updates the nSIWFID to equal oSIWFID, changes the AIWF relationship to own, and then performs the own reconnection.

IWF-initiated Reconnection

If the IP datagram is received from the Internet side in the dormant state, as shown in FIG. 15, procedure 4 of the IWF preferably identifies the link of the mobile data path and the IMSI number by checking the MBT, and requests the link setup.

The BS/MSC checks PMBT, identifies the call proceeding if the link connection is possible, and then performs the paging. Thereafter, the BS/MSC completes the following radio section connection according to the reply, and provides the connection message to the IWF to complete the link establishment.

Meanwhile, if no terminal exists or the link connection is impossible when the IWF or the MSC checks its own MBT and PMBT, the MSC sends the disconnection message to the IWF, and the IWF transmits an error message indicating that there is no receiver to the Internet side.

If the PMBT and MBT are operated according to the preferred embodiment of the present invention, the MSC connection type IWF applied to an IS-95A system provides high quality link mobility with respect to the SIP terminal by defining a virtual PZID, without providing the PZID information as the system overhead message. Accordingly, the MS continuously maintains the PPP link with the IWF, which is initially connected to the MS until the packet session is closed. Also, if the anchor service function is provided with the MSC, the MS can attain high quality mobile radio communication service even though it moves over the whole communication network.

Also, when providing a PZID in the IS-95B system, the SIP terminal can achieve the same service irrespective of the system overhead message under the same condition as the IS-95A system. Furthermore, the MS having the mobile IP client software can achieve the same link mobility as the SIP terminal though PZID or the hard handoff reconnection registration (RR) since the reconnection is restrained by the communication system. If the communication does not restrain the PZID or hard handoff RR, the MS can preferably continuously maintain the connection with the initial serving IWF in the infrastructure using the PMBT.

Accordingly, in preferred embodiments of the present invention, when the MS attempts a MIP RR, the foreign agent (FA) information broadcasted by the IWF is not changed, and thus the procedure for the MIP registration is not required. Accordingly, the time of occupancy of the radio traffic channel (TCH) can be reduced. As a result, the infrastructure simultaneously provides the service to the SIP and MIP terminals, and the link mobility is provided irrespective of the enable or disable state of the reconnection of the MIP terminal.

For instance, if the link connection of the MIP terminal cannot be maintained, i.e., if the MIP terminal is in the hard handoff state with the MSC or moves to another MSC in the dormant state, the IP mobility can be supported by the MIP registration in case of the isolate IWF. Accordingly, in order for the MIP MS to be served, PZID should be essentially considered. At this time, it is possible to determine the area which covers the multiple IWF and BSC/BTS without broadcasting the PZID through the overhead message.

FIGS. 16 to 20 are timing diagrams depicting various procedures which occur during the packet data service in a mobile radio communication network according to the present invention.

Figure 16:
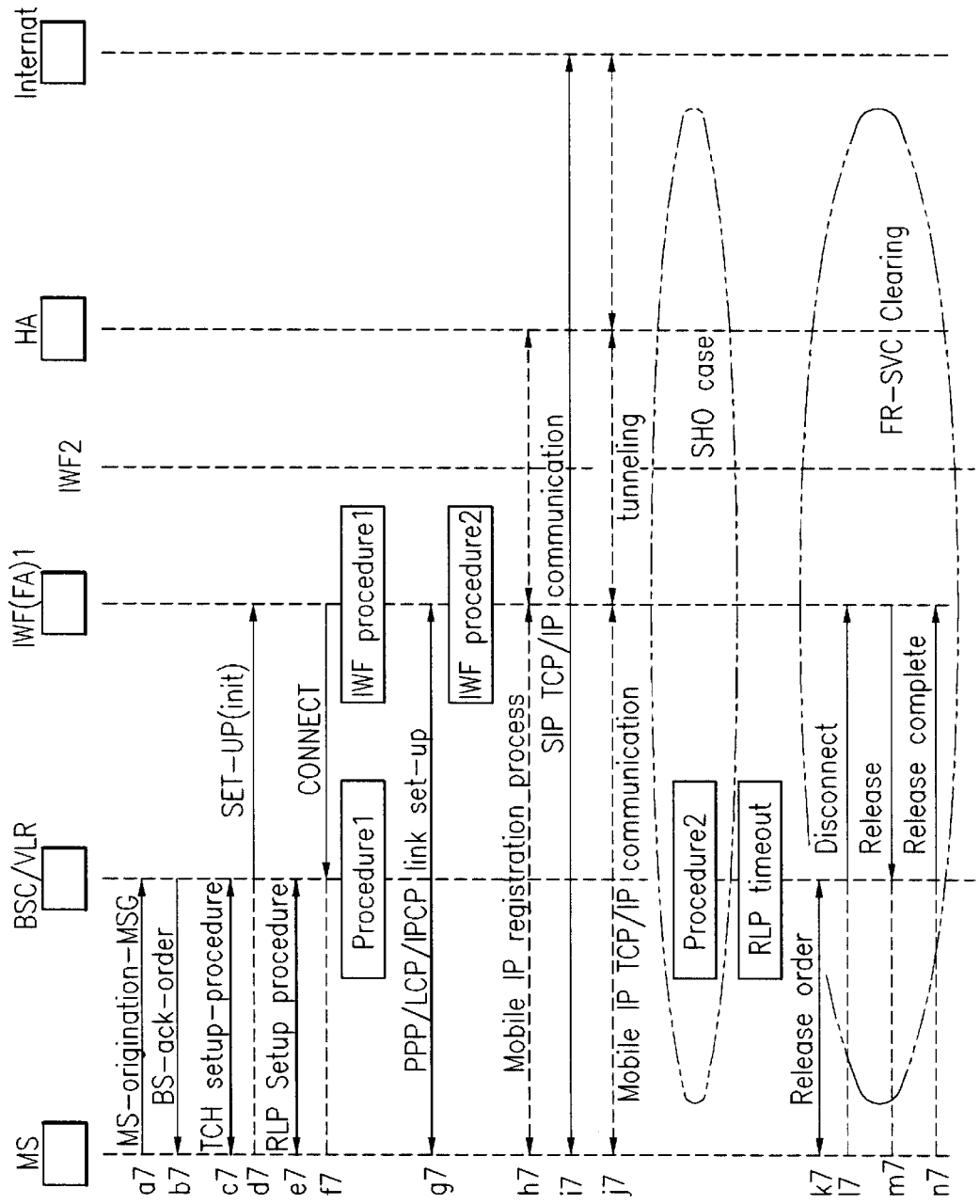

Referring to FIG. 16, if the MS originates a call to a MS/MSC as a packet service option, the BSC/VLR determines the identification of MS and whether to permit the packet service. It then permits the radio connection (step b2). Thereafter, the BSC/VLR preferably performs the packet FR-SVC setup (initiation) to the associated IWF of the corresponding PZID.

Then, the BSC/VLR makes and maintains a PMBT of the corresponding terminal through procedure 1. There exists no anchor relationship in the BSC connection type network.

The IWF creates a MBT (linksource and IMSI) using IMSI through procedure 1. At this time, if the terminal is the MIP type, the MBT (linksource and IMSI) may already exist.

Thereafter, the PPP link setup is performed between the terminal and the IWF, and the type of the SIP/MIP terminal is determined according to the client software of the MS.

The IWF completes the construction of the MBT of the MS through procedure 2, and if the MS is the MIP type, it performs the registration of the MIP MS. Also, in case of COA, the IWF relays the call. If the terminal is the SIP type, the procedure is performed without the registration of the MS. Then, after the registration of the MIP terminal is completed, an Internet communication is performed.

In the active PPP link state, if the MS performs the soft handoff for changing the PZID, the VLR changes PZID, PRAID and AIWFID of PMBT corresponding to the soft handoff through procedure 2.

Thereafter, the VLR maintains the SIWFID, and changes the serving type to the soft handoff. Since the link between the IWF and the BSC is maintained in the soft handoff state, only the relationship between the AIWF and SIWF is changed.

Figure 17:
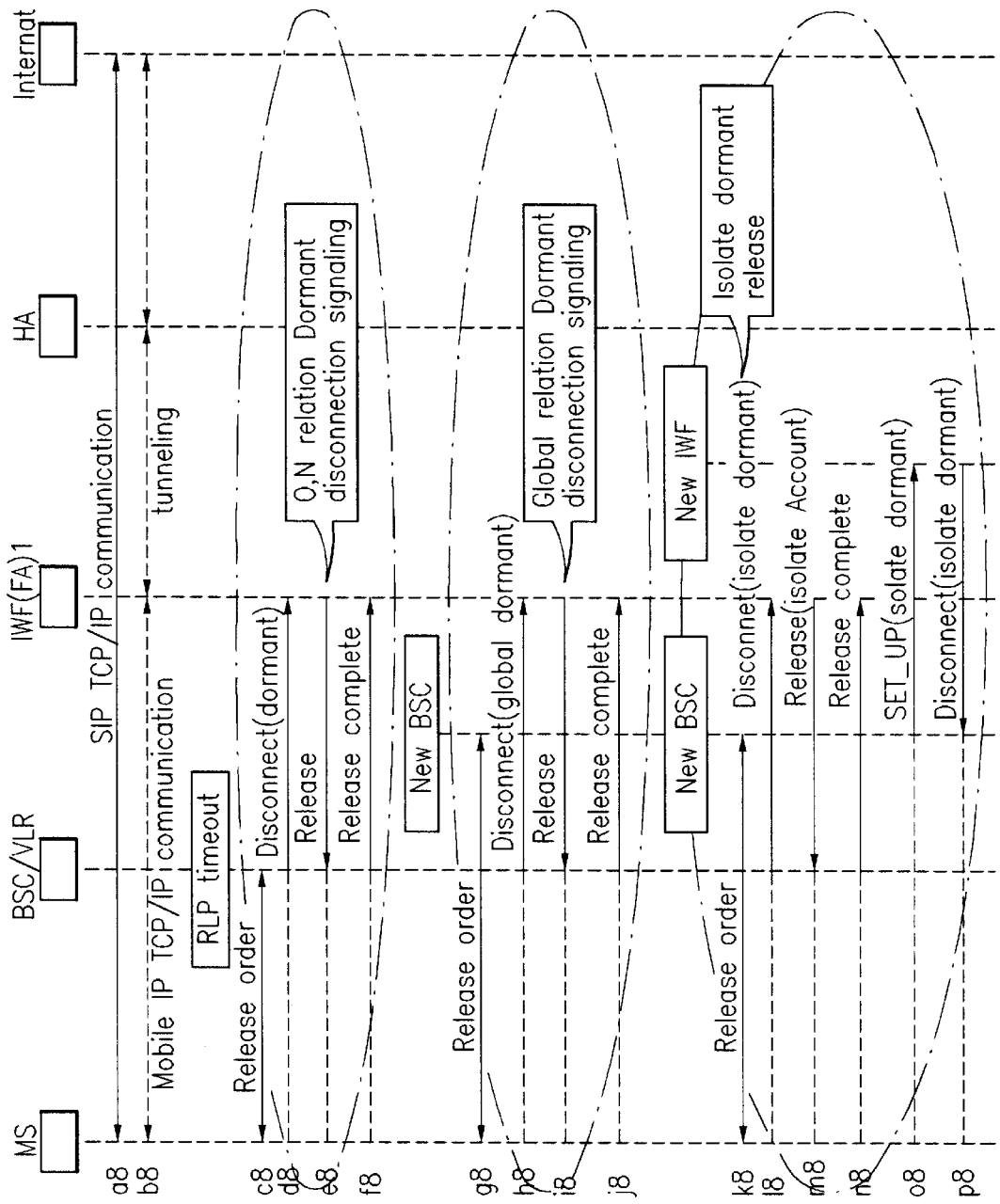

Referring to FIG. 17, if no packet data is transmitted through the RLP for a predetermined time, the BSC releases the radio section traffic channel and the link of the IWF section, and shifts the PPP link state to the dormant active state.

At this time, the VLR determines the P_state of the PMBT to be the dormant state, and the IWF determines P_state to be the dormant state.

Four cases may be produced in accordance with the relationship between the AIWFID and SIWFID at the dormant point, and the following three cases exist in view of the signal between the VLR and IWF.

a) Own, Neighbor: The VLR determines that P_state=dormant, and SIWFID serving type=normal in PMBT, and performs the FR-SVC dormant disconnection. The IWF replies with the release message, and determines that P_state=dormant in MBT.

b) Global: The VLR determines that P_state=dormant, and the MSC/BSC connected to SIWFID performs the FR-SVC global dormant disconnection (including the PMBT).

At this time, the IWF updates the link source of the MBT from the PZID of PMBT, and performs the release operation. MSC/VLR changes the AIWFID relationship to own, and determines that the SIWF serving type=normal.

c) Isolate: VLR determines that P_state=dormant in PMBT, and the MSC/BSC connected to the oSIWID requests the FR-SVC isolate dormant disconnection. The IWF replies with the release message including the account information, and clears the MBT of MS.

The MSC/VLR changes the AIWFID relationship to own, and determines that nSIWFID=AIWFID, and servstate=no in PMBT. Then, MSC/VLR transfers the account information to IWF by requesting the FR-SVC isolate dormant setup (including account and PMBT) to nSIWFID. The IWF creates the MBT, maintains the account information, and replies with the disconnection message to close the link.

Figure 18:
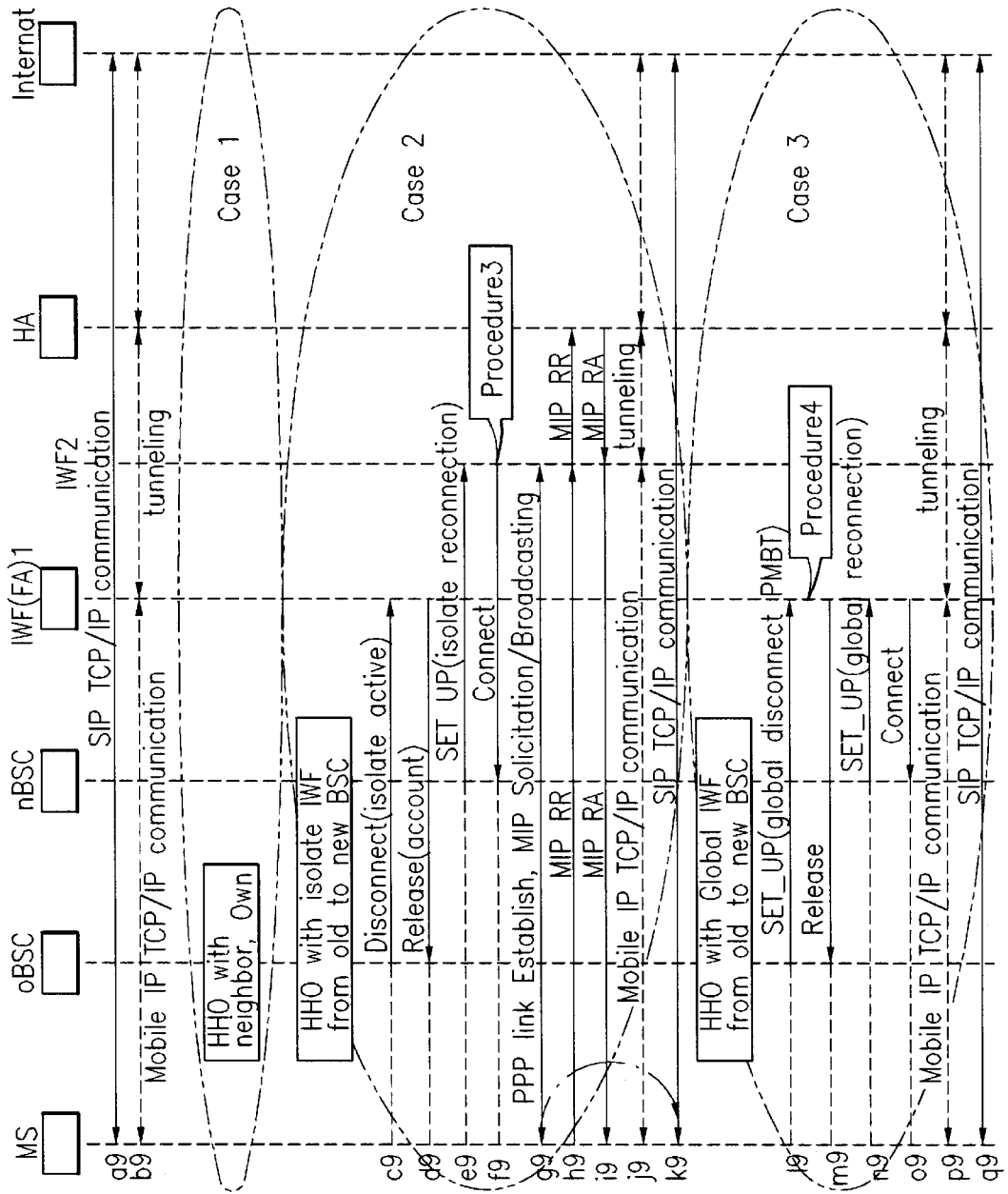

Referring to FIG. 18, the following two cases are operated according to the relationship between AIWFID and SIWFID according to PZID in the hard handoff state.

a) Neighbor or own: If the relationship is neighbor or own, the BSC connected to the MS is in a physical connection with the IWF, and thus the BSC only performs the internal link connection for connecting a new selector and SIWFID. That is, the connection is performed irrespective of the type of the SIP/MIP terminal.

Regarding the MIP terminal, the FA solicitation can be performed by detecting the change of the PZID, and since the FA advertisement informs the existing FA agent, the registration procedure of the MIP MS is omitted according to the preferred embodiments of the present invention.

b) Isolate: If the MS performed the hard handoff to a new BSC of the IWF which was separated from the SIWF in the existing old BSC, a completely new IP packet data connection should be determined for the SIP terminal.

Meanwhile, in case of the MIP terminal, the TCP/UDP (user datagram protocol) connection can be maintained by the MIP terminal, but the PPP link connection should be redetermined.

The packet connection procedure is performed as case 2 of FIG. 18.

The old BSC and the old IWF completely release the link, receive the account information, and transfer the account information along with the PMBT during the link setup with the new IWF.

When the new IWF recognizes that CALL_TYPE of the SET_INFO segment is 0x04 for an HHO call from the user-user data of SETUP during the FR link determination, it receives the account segment. The IWF creates the MBT through procedure 3 in FIG. 18.

If the traffic channel and FR-SVC are established, the PPP link is determined, and the IWF identifies whether the terminal is the SIP MS or MIP MS to check the MBT in accordance with the IP request of the terminal.

Accordingly, the SIP terminal redetermines the TCP link according to the new IP address to perform the communications. Meanwhile, the MIP terminal maintains the TCP/UDP link through the MIP registration procedure to continue the communications.

Figure 19:
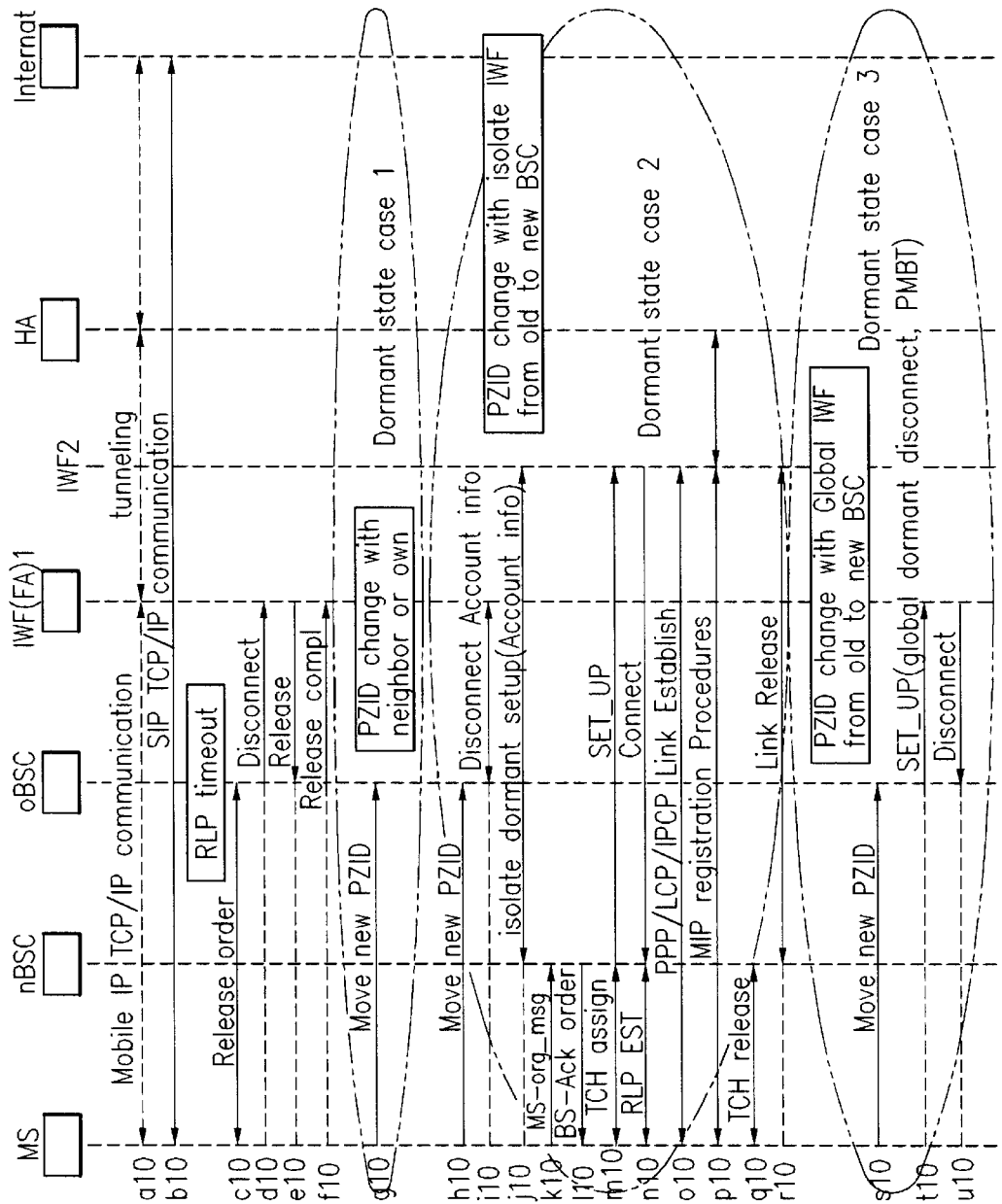

Referring to FIG. 19, if the MS is shifted to the dormant state, the VLR detects the registration message of the MS, updates the PMBT, and only performs the PMBT updating when the relationship between the AIWF and SIWF is changed to neighbor and own.

If the PMBT is updated with the isolated IWF area, the VLR receives the account information from the old IWF as in the hard handoff operation in the active state, and performs the FR-SVC isolate dormant disconnection, while the new BSC and the NEW IWF exchange the account information, and update the PMBT.

Meanwhile, with respect to the MIP terminal, if the MIP registration reconnection is enabled, the MS identifies the change of PZID, performs the registration of the MIP terminal by requesting the packet call for the registration of the MIP terminal, and then returns to the dormant state.

If the MS moves to a PZID of the global IWF relationship, the two IWFs are the same, and thus only the updating of PMBT is performed with respect to the MS which was initialized by the reconnection. However, where the IWF was initialized by the reconnection, the link source should be recognized. Accordingly, after the PMBT is updated, the IWF should update the MBT of the MS by transferring the PMBT of the MS to the IWF as the mobility_info segment by the setup operation.

Referring TO FIG. 20, if the present state is changed from the dormant state to the active state caused by the generation of the packet data to be transmitted, the origination or termination of the MS is performed according to the corresponding PMBT or MBT since the link routing has already been determined by the PMBT or the MBT.

At this time, if the relationship is own or neighbor, procedure 4 of the BSC/VLR in FIG. 20 updates the packet service state and servstate in the PMBT, and procedure 7 of the IWF changes the packet state in the MBT to the active state.

Where there exists a global relationship, the FR link of the old BSC and IWF is released (global disconnection), the link connection with a new BSC and the global reconnection are performed to maintain the PPP link connection between the MS and IWF.

In case of the isolate relationship, the isolate disconnection between the old BSC and the oIWF (including account) is performed, and then the isolate reconnection between the new BSC and the nIWF is performed to restart the PPP link establishment.

Procedure 8 of the IWF performs the conversion of IP to IMSI in the MBT, and identifies the link source port.

The IWF-originated link connection with MS is performed only when PMBT of MS is completed and maintained in the infrastructure. In the unstable state (i.e., when the PMBT updating is proceeding), the IWF receives the disconnection reply and then sends an ICMP (unreachable) message to the Internet side.

As described above, according to the preferred embodiment of the present invention, the relay PPP link connection between a mobile station and an initially connected interworking function device (SIWF) is maintained based on the relationship between the present interworking function device (AIWF) of a new packet zone identifier and the interworking function device (SIWF) which maintained the PPP link before the movement of the mobile station. This occurs even if the mobile station changes the identifier of the packet zone previously served and moves to an area having the new packet zone identifier in the environment of a mobile radio communication network of cellular/PCS/IMT-2000. Accordingly, where the mobile packet data service is served through the SIP terminal whose mobility is not supported, it is not required to redetermine the PPP link and the protocol of the upper layer of the PPP layer whenever the PZID is changed.

Also, where the mobile packet data service is served through the MIP terminal whose mobility is supported, the mobile IP registration is performed whenever the terminal moves between the packet zone identifier (PZID) areas, and thus the waste of time and the loss of data caused by the occupation of the traffic channel of the radio section and the PPP link redetermination is prevented.

Moreover, in the packet data service system having the mobile switching center connection type interworking function device, since the interworking function devices which provide the packet data service to all the packet zones are connected to the mobile switching center, it is preferable that all the interworking function devices connected to the mobile switching center can mutually have the neighbor relationship, and the interworking function devices connected to another mobile switching center can have the anchor relationship by connecting the links between the mobile switching centers. Accordingly, since the complete link mobility is provided to the SIP terminal in the same system, the call is not cut off even when the mobile station is served with the packet service through the Internet.

Also, since the MIP terminal does not change the SIWF if the packet service is already registered, the mobile IP registration is not required even when PZID is changed, and thus the radio traffic resource is not used. This provides a more economical service than the conventional system. Additionally, if the MIP terminal is previously registered, a complete link mobility is provided even when the hard handoff reconnection, zone-based registration or reconnection of the MIP terminal is disabled, and thus the infrastructure does not require the occupation of the radio traffic for the registration of the MIP terminal.

Also, with respect to the base station controller connection type network, since the global type packet network wherein a plurality of base station controllers are connected to one interworking function device is constructed rather than an isolate type wherein a plurality of interworking function devices are connected to the respective base station controllers, the frequency of the MIP terminal registration can be reduced and the SIP terminal can be served with a seamless Internet service within the restricted range (within the area of the global interworking function device).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A packet data service system, comprising:
   a packet router to provide one of an originating and terminating traffic path for a plurality of mobile stations in a first network and managing particulars of an event using tables whenever the event is produced in the mobile stations; and
   an interworking function device to control the packet router to interwork with a second network;
   the tables including a first information table for managing information on the packet router for controlling a prescribed service area, a second information table for managing mobility of the mobile station with respect to the prescribed service area during a packet data service of the mobile station and a third information table for managing a service area identifier of the interworking function device connected to the packet router, a connection type of the packet router, and a relationship between interworking function devices if a plurality of interworking devices are provided, wherein if a first mobile station among the plurality of mobile stations deviates from the prescribed service area of the interworking function device while the first mobile station is being served with the packet data service interworking with the second network, the packet router continuously maintains a point-to-point (PPP) link initially determined between the first mobile station and the interworking function device in accordance with the managed particulars of the event.

2. The system of claim 1, wherein the first mobile station is one of a mobile station having internal software for maintaining a call connection of a network layer of the second network connected to the mobile station when the mobile station deviates from the prescribed service area and a mobile station having no internal software.

3. The system of claim 1, wherein the packet router comprises a base station controller and a mobile switching center for managing information on mobility of the mobile station.

4. The system of claim 1, wherein the prescribed service area is one of a cell area, a radio connective area of a base station controller, and a unit area to which one interworking function device is physically connected.

5. The system of claim 1, wherein the event is one of an originating call request, a terminating call request, a handoff request, a position registration request in an inactive state, and a reconnection request of the mobile station.

6. The system of claim 1, wherein the first information table includes a parameter which indicates the interworking function device connected to the mobile station when the mobile station in the service area requests the packet data service.

7. The system of claim 1, wherein the second information table includes:
   a first parameter, which indicates an area where the mobile station is currently registered;
   a second parameter, which indicates the identifier of the interworking function device corresponding to the registered area;
   a third parameter, which indicates a relationship with the interworking function device currently providing the service; and
   a fourth parameter, which indicates the identifier and service type of the interworking function device to which the mobile station is connected through the PPP link.

8. The system of claim 1, wherein the third parameter selectively indicates one of:
   a) a case that the corresponding interworking function device is identical to the serving interworking function device;
   b) a case that the corresponding interworking function device is identical to the serving interworking function device, but links through which the packet router is connected to the corresponding interworking function device and the serving interworking function device are different;
   c) a case that different interworking devices are connected together through the packet router;
   d) a case that a relay link between the mobile station and the interworking function device are connected through a packet router of an intermediate layer; and
   e) a case that the packet router does not provide the PPP link between the mobile station and the interworking function device.

9. The system of claim 1, wherein the third information table includes:
   a fifth parameter, which indicates an area currently served by the corresponding interworking function device;
   a sixth parameter, which indicates a type that the corresponding interworking function device is connected to the packet router; and
   a seventh parameter, which indicates a list of an adjacent interworking function devices to which the mobile station currently served in an area wherein the corresponding interworking function device identifier provides the service is connective as the mobile station continuously maintains the PPP link.

10. The system of claim 9, wherein a fifth information table is provided for the respective interworking function device if the fifth parameter has a specified value, and manages an identifier of an area which is controlled by the packet router served by the corresponding interworking function device.

11. The system of claim 1, wherein the mobile radio communication network is based on one of a cellular, PCS, and IMT-2000 communication network.

12. A packet data service system in a mobile radio communication network, comprising:
   a base station;
   a base station controller;
   a mobile switching center; and
   an interworking function device, wherein the system is divided into a plurality of unit areas, wherein the mobile switching center or the base station controller manages a packet mobility binding table (PMBT) to manage a mobility of an infra link for a packet data service of a specified mobile station under the control of the mobile switching center or the base station controller, and the interworking function device manages a mobility binding table (MBT) to maintain a data link between the mobile station and the interworking function device from a time when the mobile station is registered in the interworking function device to a time when a packet session is closed or the mobile station performs a de-registration, and wherein if the mobile station moves from a first radio unit area to a second radio unit area, the data link connection between the mobile station and the interworking function device is controlled in accordance with information on the PMBT and the MBT.

13. The system of claim 12, wherein each of the plurality of unit areas is one of a packet zone identifier (PZID) and a packet registration area (PRA).

14. The system of claim 13, wherein the PZID corresponds to the PRA in a one-to-one manner, and the PRA is created based on the interworking function device and a serving router.

15. The system of claim 12, wherein the mobile station is a simple IP (SIP) mobile station to which no mobile IP client software is supported, and if the SIP mobile station moves from the first radio unit area to the second radio unit area, a link between the SIP mobile station and the mobile switching center is connected through the mobile station and the interworking function device serving the first radio unit area.

16. The system of claim 12, wherein during a packet service active state of the mobile station, the mobile switching center or a visitor location register respectively manages:
   a unit area identifiers table, which indicates an associated serving interworking function device which corresponds to a unit area identifier defined in the communication system, and information on the base station controller and the base station which serve the unit area; and
   an interworking function device table, which indicates the serving unit areas of all interworking function device identifiers connected to the areas of the base station controller or the mobile switching center which are managed by the mobile switching center, a connection type of the base station controller or the mobile switching center, and a mutual relationship between the interworking function devices.

17. The system of claim 16, wherein the unit area identifiers table includes:
   a packet zone identifier (PZID) field, which indicates the PZID uniquely divided in a unit of the base station controller or base station in the whole communication system;
   a base station controller identifier (BSCID) field, which indicates the BSCID in the corresponding PZID area; and
   a serving interworking function device identifier (SIWFID) field, which indicates the SIWFID that is connected when the mobile station in the PZID area requests the packet service.

18. The system of claim 16, wherein the interworking function device table includes:
   an interworking function device identifier (IWFID) field, which indicates the IWFID uniquely divided in the unit of the mobile switching center in the whole communication system;

a packet zone identifier (PZID) field, which indicates the PZID area served by the corresponding interworking function device identifier;

a type/base station controller identifier (BSCID) field, which divides a physical connection type between the corresponding interworking function device and the base station controller or the mobile switching center; and a Nlist global list field, which indicates a list of the associated interworking function device managed by the corresponding mobile switching center or the base station controller to which the mobile station served in the PZID served by the corresponding interworking function device can be connected while the mobile station continuously maintains the data link.

19. The system of claim 18, wherein if the PZID field in the interworking function device table has a prescribed value, a global PZID table is provided for each IWFID.

20. The system of claim 19, wherein the global PZID table includes:

an IWFID field, which indicates the interworking function device identifier created for each interworking function device;

a BSCID field, which is registered for each connected base station controller if the interworking function device is of a base station controller connection type and which has a PZID list as a sub-file; and a mobile switching center identifier (MSCID) field, which is registered for each connected mobile switching center if the interworking function device is of a mobile switching center connection type and which has a PZID list as a sub-file.

21. The system of claim further comprising an anchor interworking function device table to make the data link with the serving interworking function device, to which a second mobile switching center provided the previous packet service by an ISLP protocol, the data link being maintained even when the mobile station is hard-handed off to a new mobile switching center with its packet session maintained, when the mobile station is connected to a packet network of the second mobile switching center and is served with the packet service.

22. The system of claim wherein the anchor interworking function device table comprises:

a mobile switching center identifier (MSCID) field, which indicates a MSCID which enables a mutual anchoring service between the present mobile switching center and another mobile switching center by connecting the present mobile switching center to the another mobile switching center and interworking packet service traffic data by the ISLP protocol; and an interworking function (IWF) field for indicating an identifier of the IWF device which serves a packet zone under the control of the corresponding mobile switching center and which is connected by the ISLP protocol to the mobile station located in the packet zone under the control of the another mobile switching center and performs the anchoring service.

23. The system of claim 12, wherein the PMBT comprises:

a packet zone identifier (PZID) field, which indicates an area where the mobile station is currently registered;

an associated interworking function device identifier (AIWFID) field, which indicates a relationship between an associated interworking function device (AIWF) which should serve the unit area currently registered and a serving interworking function device (SIWF); and a serving internetworking device identifier (SIWFID) field, which indicates the identifier and service type of the interworking function device to which the mobile station is connected through the data link.

24. The system of claim 23, wherein the relationship is one of:

a) the associated interworking function device (AIWF) is identical to the serving interworking function device (SIWF);

b) the AIWF is identical to the SIWF, but links through which the mobile switching center are connected to the AIWF and the SIWF are different;

c) different interworking devices are connected together through a packet router;

d) a relay link between the mobile station and the interworking function device are connected through the packet router of an intermediate layer; and e) the mobile switching center does not provide the data link between the mobile station and the interworking function device.

25. The system of claim 23, wherein the PMBT further comprises:

a REG_state field, which indicates whether a present registration state of the mobile station is serving or anchoring;

a P_state field, which indicates whether a present packet data service state of the mobile station is active or inactive; and a Servstate field, which indicates whether the serving interworking function device (SIWF) has performed the packet data service and has an account information or not.

26. The system of claim 12, wherein the MBT includes:

an IPtype field, which indicates an IP service option used by the mobile station that requested an Internet packet data service;

a P_state field, which indicates a present packet data service state;

an IPADDR field, which indicates a home IP address for the data link which the mobile station is currently allocated with and uses;

a care of address (COA) type field, which indicates a COA used by a mobile internet protocol (MIP) mobile station;

a COA field, which indicates a COA which the mobile station is currently allocated with and uses;

a home agent address (HAA) field, which indicates a HAA of the mobile station or the MIP mobile station; and a Linksource field, which indicates a physical port to which data traffic of the mobile station is currently connected.

27. The system of claim 12, wherein the interworking function device (IWF) further comprises and manages:

an IWF system declaration table (ISDT), which manages to support the link mobility of the mobile station; and a mobile data path table, which manages information on the base station controller/mobile switching center which are connected to each physical port or logical port of a mobile data path connected to the base station controller/mobile switching center.

28. The system of claim 27, wherein the ISDT comprises:
a Sysid field, which indicates an inherent IWFID uniquely given in the communication system;
a domain identifier field, which indicates an identifier (SID/NID) of a system area served by the interworking function device;
a zone identifier field, which indicates an identifier list of an associated packet zone served by the IWF; and
a Soption field, which indicates a service option list which can be serviced by the interworking function device.

29. The system of claim 27, wherein the mobile data path table comprises:
a PortID field, which indicates an identifier of a physical connection port or a logical connection port for a mobile data path which the IWF has;
a MSC/BSCID field, which indicates an identifier of the mobile switching center or the base station controller connected to the corresponding port;
a GRID field, which indicates a group identifier for each mobile switching center/base station controller as a group number to which the corresponding port belongs;
a Type field, which discriminates as to whether the interworking function device is of a mobile switching center connection type or of a base station controller connection type; and
an APSID field, which indicates an identifier of the associated unit area served by the corresponding port.

30. A method of operating a packet data service in a mobile radio communication network, comprising the steps of:
setting up a point-to-point (PPP) link between a mobile station and an interworking function device for interworking packet paths between the mobile station and another network in accordance with the packet data service required by the mobile station;
managing particulars of an event in a packet router for routing the PPP link whenever the event is created by the mobile station by using a first information table for managing information on the packet router for controlling a predetermined service area, a second information table for managing mobility of the mobile station with respect to the predetermined service area during a packet data service of the mobile station and a third information table for managing a service area identifier of the interworking function device connected to the packet router, a connection type of the packets router, and a relationship between interworking function devices if a plurality of interworking devices are provided, in a packet router for routing the PPP link; and
continuously maintaining the PPP link initially determined or changing a relay path between the mobile station and the packet router using the managed particulars of the event in accordance with a cause of the event in the packet router if the event is created in a state that the mobile station deviates from the predetermined area.

31. The method of claim 30, wherein the event is one of an originating call request, a terminating call request, a handoff request, a position registration request in an inactive state, and a reconnection request of the mobile station.

32. The method of claim 30, wherein if the mobile station requests an originating call for performing the packet service, the packet router judges whether the second information table is created, and if it is judged that the second information table is not created, the packet router creates the second information table, and compares the identifier of the area in which the mobile station requested the originating call with the identifier of the area in the second information table already created, and wherein if the identifiers of the two areas are identical as a result of comparison, the packet router does not update the currently serving interworking function device from the second information table, while if the identifiers are different from each other, the packet router updates the currently serving interworking function device from the second information table, obtains a relationship between the identifier of the updated interworking function device and the identifier of the previously serving interworking function device, and performs a reconnection according to the obtained relationship.

33. The method of claim 32, wherein the second information table is created by identifying the identifier of the area in which the mobile station originates the call, and obtaining the identifier of the currently serving interworking function device from the first information table in the packet router.

34. The method of claim 32, wherein the relationship is one of:
a) a first relationship that a plurality of area identifiers are registered in the third information table when the identifier of the updated interworking function device is identical to the identifier of the previously serving interworking function device;
b) a second relationship that no area identifier is registered in the third information table though the identifier of the updated interworking function device is identical to the identifier of the previously serving interworking function device;
c) a third relationship that the identifier of the previously serving interworking function device is registered in the third information table when the identifier of the updated interworking function device is not identical to the identifier of the previously serving interworking function device;
d) a fourth relationship that the identifier of the previously serving interworking function device is not registered in the third information table and thus there exists the packet router to which the serving interworking function device identifier belongs when the identifier of the updated interworking function device is not identical to the identifier of the previously serving interworking function device; and
e) a fifth relationship that the identifier of the previously serving interworking function device is not registered in the third information table and there exists no packet router to which the serving interworking function device identifier belongs when the identifier of the updated interworking function device is not identical to the identifier of the previously serving interworking function device.

35. The method of claim 34, wherein a dormant reconnection is performed if the relationship between the updated interworking function device and the serving interworking function device is own or neighbor, while an anchor reconnection is performed if the relationship is anchor.

36. The method of claim 30, wherein if the PPP link is continuously maintained or the relay path between the mobile station and the packet router is changed, the packet router identifies whether the managed particulars of the event is the latest updated information, and performs the service according to a result of identification.

37. A method of operating a packet data service in a mobile radio communication network comprising the steps of:

originating a call to a base station controller as a packet service option in a mobile station;

permitting a radio connection in the base station controller after identifying a identification of the mobile station and whether to permit the packet service;

performing a packet FR-SVC SETUP (initiation) to an interworking function device associated with a corresponding unit radio area in the base station controller;

making and maintaining a packet mobility binding table (PMBT) of the corresponding mobile station in the base station controller;

setting up a point-to-point (PPP) link between the mobile station and the interworking function device;

making a mobility binding table (MBT) of the mobile station in the interworking function device; and performing a registration or relay with respect to the mobile station.

* * * * *